United States Patent
Goodman

(10) Patent No.: US 10,656,801 B1
(45) Date of Patent: May 19, 2020

(54) SYSTEMS AND METHODS FOR CREATING, ARCHIVING AND SHARING DIGITAL ASSETS

(71) Applicant: Inkbench LLC, Fairfield, NJ (US)

(72) Inventor: Steve Goodman, Montclair, NJ (US)

(73) Assignee: Inkbench Inc., Montclair, NJ (US)

( * ) Notice: Subject to any disclaimer, the term of this patent is extended or adjusted under 35 U.S.C. 154(b) by 4 days.

(21) Appl. No.: 15/479,416

(22) Filed: Apr. 5, 2017

Related U.S. Application Data

(60) Provisional application No. 62/318,444, filed on Apr. 5, 2016.

(51) Int. Cl.
| | |
|---|---|
| G06F 9/48 | (2006.01) |
| G06F 3/0484 | (2013.01) |
| H04L 29/08 | (2006.01) |
| G06Q 50/00 | (2012.01) |
| G06Q 10/10 | (2012.01) |

(52) U.S. Cl.
CPC ............ G06F 3/0484 (2013.01); H04L 67/10 (2013.01); G06Q 10/10 (2013.01); G06Q 50/01 (2013.01); H04L 67/02 (2013.01); H04L 67/306 (2013.01)

(58) Field of Classification Search
CPC ....... G06F 3/0484; H04L 67/10; H04L 67/02; H04L 67/306; G06Q 10/10; G06Q 50/01
See application file for complete search history.

(56) References Cited

U.S. PATENT DOCUMENTS

| | | | | |
|---|---|---|---|---|
| 5,889,932 | A * | 3/1999 | Adegeest | G06T 19/20 358/1.18 |
| 2005/0044485 | A1 | 2/2005 | Mondry et al. | |
| 2005/0071736 | A1 | 3/2005 | Schneider et al. | |
| 2005/0222905 | A1 | 10/2005 | Wills | |
| 2006/0031257 | A1 | 2/2006 | Lipscomb et al. | |
| 2007/0083496 | A1 * | 4/2007 | Martinez | G06F 21/10 |
| 2010/0010944 | A1 | 1/2010 | Cheng et al. | |
| 2011/0016406 | A1 | 1/2011 | Grosz et al. | |
| 2011/0314101 | A1 * | 12/2011 | Redmon | G06Q 10/10 709/204 |
| 2013/0076773 | A1 | 3/2013 | Chen et al. | |
| 2013/0314434 | A1 | 11/2013 | Shetterly et al. | |
| 2015/0074504 | A1 | 3/2015 | Steinfl et al. | |
| 2015/0134492 | A1 | 5/2015 | Harrison et al. | |
| 2015/0193409 | A1 | 7/2015 | Portnoy et al. | |
| 2016/0035055 | A1 | 2/2016 | Perkins et al. | |
| 2016/0366196 | A1 * | 12/2016 | Boss | G06Q 10/101 |

OTHER PUBLICATIONS

Lee, Kevan, "500,000 Beautiful Social Media Images Later: Introducing Pablo 2.0, Perfect Images to Fit All Networks," Buffer News, Oct. 15, 2015. https://blog.bufferapp.com/pablo-images-for-instagram-pinterest-twitter-facebook.

* cited by examiner

*Primary Examiner* — Jennifer N To
*Assistant Examiner* — Kuang F Chen
(74) *Attorney, Agent, or Firm* — Zeller IP Group, PLLC; Kyle M. Zeller

(57) ABSTRACT

Methods, systems and apparatuses, including computer programs encoded on computer storage media, are provided for creating documents, such as graphic assets and corporate identity materials, incorporating enterprise branding elements, photography, video and other approved visual identity elements. The described embodiments provide a document creation environment integrated with visual identity compliance, digital asset management, sharing, collaboration and administration functionality.

16 Claims, 20 Drawing Sheets

SYSTEMS AND METHODS FOR CREATING, ARCHIVING AND SHARING DIGITAL ASSETS

CROSS-REFERENCE TO RELATED APPLICATIONS

The present application claims benefit of U.S. provisional patent application Ser. No. 62/318,444, titled "Systems and Methods for Creating, Archiving and Sharing Digital Assets," filed Apr. 5, 2016, which is incorporated by reference herein in its entirety.

BACKGROUND

This specification relates generally to systems and methods for managing digital assets and creating shareable documents therefrom. More specifically, the specification relates to a platform for creating social media and other documents from digital assets in combination with visual identity compliance, digital asset management, sharing functionality, and/or administration features.

As social media networks such as FACEBOOK, LINKEDIN and TWITTER have grown in popularity, online applications for producing images and other social media assets for such networks have become widely available. Additionally, the need to develop brand-compliant images for websites, intranets, and other corporate communications channels has become widespread.

One exemplary digital media creation application is the CANVA online graphic design platform (available at canva.com), which offers design tools as well as a library of images. This application allows designers to set up a variety of templates in various file formats, including social media posts and a brand kit with a company's logo and color palette.

Another exemplary application is the PABLO social media management tool by Buffer (available at pablo.buffer.com). This application allows marketers and small businesses to create images formatted for social media websites, including TWITTER, FACEBOOK, INSTAGRAM, and PINTEREST. The PABLO online image creation tool includes typography, font size, and formatting options. The application allows customers to select one or more social accounts to which content will be posted and further allows customers to schedule social media posts for release throughout the day.

The SNAPPA online graphic design tool (available at snappa.io) is intended for use on social media and ad networks. This application keeps track of image dimensions for various social media platforms and sizes images in accordance with those dimensions. The application allows users to store and edit designs and schedule image posts.

Yet another exemplary application is the PICMONKEY online image editor (available at picmonkey.com). This application allows users to edit and/or create photos, designs, and collages. And such assets may be output to one or more image formats in preset sizes.

These and other similar applications do not fully address the needs of customers wishing to easily create, store, collaborate on, and share brand-compliant corporate communications graphic assets (including those for social media, plasma screen, web parts, emails, posters, banners, brochures etc.) and fail to provide an integrated environment that combines robust visual identity compliance, digital asset management, and digital asset creation tools. For example, the CANVA application offers graphic tools for digital asset creation and allows users to create a brand kit with the customer's company logo and color palette, but does not offer robust visual identity compliance in the form of approved images and approved branded visual identity elements (e.g., logos, footers, taglines, etc.) The PABLO application allows customers to create images formatted for social media websites but does not offer visual identity compliance features. The SNAPPA and PICMONKEY applications likewise allow users to create digital content, but do not support visual identity compliance. Because such applications do not provide an integrated environment for generating digital assets, using these applications can be inefficient, labor-intensive, and expensive.

There is therefore a need in the art for a product that provides an integrated environment directed to the creation and sharing of documents from digital assets, including visual identity compliance and digital asset management.

SUMMARY

In accordance with the foregoing objectives and others, methods, systems, including computer programs encoded on computer storage media, are provided for creating documents, such as graphic assets and corporate identity materials, incorporating digital assets, including but not limited to, enterprise branding elements, photography, video and/or approved visual identity elements. The described embodiments, provide a document creation environment integrated with visual identity compliance, digital asset management, sharing, collaboration and/or administration functionality.

In one embodiment, a computer program product encoded on one or more non-transitory computer storage media is provided. The computer program product includes instructions that when executed by one or more computers, cause the one or more computers to perform a number of operations. Such operations may cause the one or more computers to receive an enterprise rule relating to creating documents for a plurality of workspaces associated with an enterprise. The plurality of workspaces includes, at least, a first workspace and a second workspace. The one or more computers may also receive a first workspace rule relating to creating documents for the first workspace. The one or more computers further receive a second workspace rule relating to creating documents for the second workspace. The enterprise rule, the first workspace rule, and the second workspace rule are stored in a database by the one or more computers. Furthermore, a first digital asset associated with the enterprise and the first workspace is stored in the database. Furthermore, a second digital asset associated with the enterprise and the second workspace is also stored in the database.

The one or more computers may display a first document creation interface to a first user associated with the enterprise and the first workspace. The interface shows a first list of digital assets which includes the first digital asset but not the second digital asset. The interface also shows a first canvas having first canvas dimensions. The first canvas is adapted to receive one or more of the listed digital assets. The one or more computers add the first digital asset to the first canvas in accordance with the enterprise rule and the first workspace rule. The one or more computers create a first document having the first canvas dimensions and the first digital asset.

The one or more computers display a second document creation interface to a second user associated with the enterprise and the second workspace. The interface shows a second list of digital assets which includes the second digital asset but not the first digital asset. The interface also shows a second canvas having second canvas dimensions. The second canvas is adapted to receive one or more of the listed digital assets. The one or more computers add the second digital asset to the second canvas in accordance with the enterprise rule and the second workspace rule. The one or more computers create a second document having the second canvas dimensions and the second digital asset. The first document and the second document are stored in the database.

In another embodiment, a system including one or more computers and one or more storage devices is provided. The one or more storage devices store instructions that when executed by the one or more computers cause the one or more computers to perform operations. Such operations cause the one or more computers to receive an enterprise rule relating to creating documents for a plurality of workspaces associated with an enterprise. The plurality of workspaces includes, at least, a first workspace and a second workspace. The one or more computers also receive a first workspace rule relating to creating documents for the first workspace. The one or more computers further receive a second workspace rule relating to creating documents for the second workspace. The enterprise rule, the first workspace rule, and the second workspace rule are stored in a database by the one or more computers. Furthermore, a first digital asset associated with the enterprise and the first workspace is stored in the database. Furthermore, a second digital asset associated with the enterprise and the second workspace is also stored in the database.

The one or more computers display a first document creation interface to a first user associated with the enterprise and the first workspace. The interface shows a first list of digital assets which includes the first digital asset but not the second digital asset. The interface also shows a first canvas having first canvas dimensions. The first canvas is adapted to receive one or more of the listed digital assets. The one or more computers add the first digital asset to the first canvas in accordance with the enterprise rule and the first workspace rule. The one or more computers create a first document having the first canvas dimensions and the first digital asset.

The one or more computers display a second document creation interface to a second user associated with the enterprise and the second workspace. The interface shows a second list of digital assets which includes the second digital asset but not the first digital asset. The interface also shows a second canvas having second canvas dimensions. The second canvas is adapted to receive one or more of the listed digital assets. The one or more computers add the second digital asset to the second canvas in accordance with the enterprise rule and the second workspace rule. The one or more computers create a second document having the second canvas dimensions and the second digital asset. The first document and the second document are stored in the database.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
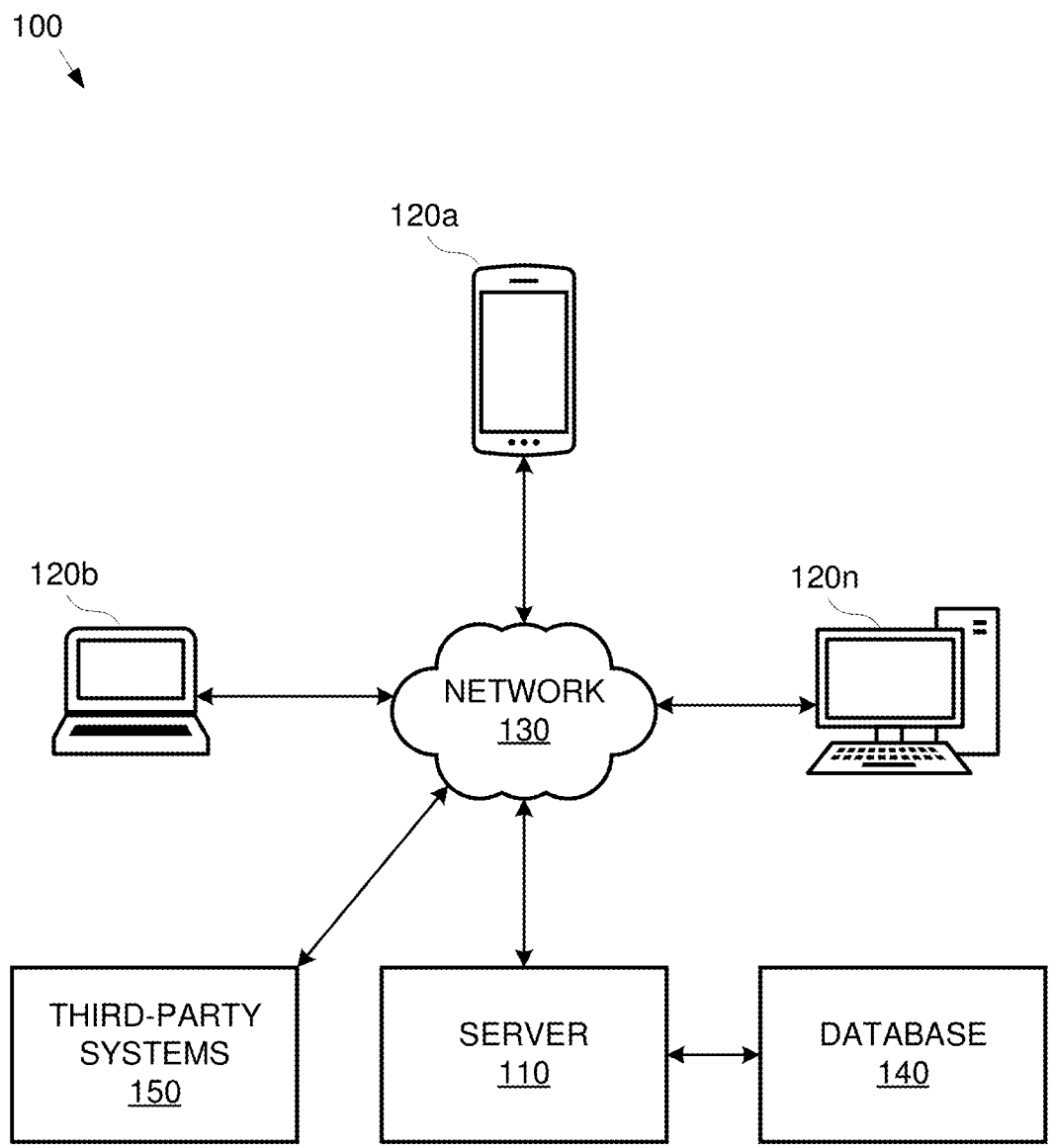
FIG. 1 is a block diagram that shows an exemplary system for managing, creating, and sharing digital assets.

Disclosed are various methods, systems and apparatuses, including computer programs encoded on computer storage media, for the management of digital assets and the creation of sharable documents therefrom. The disclosed embodiments may comprise a server accessible via a client application, which may be installable and executable on user devices such as computers, smartphones, or tablets. Additionally or alternatively, the client application may be available as one or more web applications, accessible via a client device having an internet browser.

The described platform combines visual identity compliance, digital asset management, digital asset creation, collaboration and enterprise/workspace user administration features to provide solutions to the above-discussed disadvantages of the known prior art. In some embodiments, digital asset creation and management features may allow users to store and manage digital assets, create documents of various sizes and formats from such assets; output and/or archive such documents in various formats (e.g., JPEG, animated GIFs, video files, PSD files, EML files, PDF files, HTML, etc.); and/or share created documents via email, text, and social media networks (e.g., with a scheduling capability). The systems and methods disclosed herein dramatically reduce the effort required to produce brand-compliant documents by, among other things, allowing users to build and maintain an archive of past projects, offering a library of approved assets, limiting design options to ensure documents conform to established visual identity standards, and simplifying the publication of documents across a variety of platforms and mediums.

Definitions

As used herein, the term "digital asset(s)" or "asset(s)" refers to digital files that may be stored in the digital asset management system, including document content, projects, templates, documents, and other files in various formats (e.g., JPEG, animated GIFs, video files, PSD files, EML files, PDF files, HTML, DOC, DOCx, PPT, etc.).

The term "document content" is used herein to describe any content that may be stored by the system (e.g., via the digital asset management module) and that may be used in a project to create a document (e.g., via a document creation module). Document content may comprise: images, photos, videos, GIFs, icons, logos, audio files, text, shapes, background colors/patterns, footers, headers, and/or other digital content.

The term "project(s)" may refer to a working file that is stored by the system and that comprises document content. As discussed herein, a user may create a project (or open an existing project) in order to output one or more documents therefrom. And both document content and any outputted documents may be associated with a project in the digital asset management module.

As used herein, the term "template(s)" may refer to a saved project that comprises one or more locked document content elements. As discussed in detail below, a template may be easily created (e.g., by a workspace administrator) and then duplicated and updated by a user to quickly produce a new project incorporating the locked document contents.

As used herein, the term "document(s)" may refer to a file (e.g., RGB, JPG, JPEG, PNG, HTML, GIF, BMP, DOCX, PDF, AI, PSD, SVG, PPT, etc.) created and/or stored by the system from a project. Exemplary documents include, but are not limited to: social media documents; printed and electronic cards; logos; flyers; banners; reports and presentations; brochures; calendars; infographics; book, magazine and other publication covers; printed and electronic newsletters; collages; business cards; gift certificates; mockups; media kits; labels; posters; event tickets and programs; resumes; proposals; letterheads; invitations and announcements; album covers; plasma screen backgrounds; and packaging. It will be appreciated that multiple documents having varying dimensions and/or file types may be outputted from a single project. It will further be appreciated that the term documents is intended to include metadata and any files associated with a document, such as licenses, descriptions, releases, etc. (described below).

In one embodiment, documents may comprise specific file types, sizes and formats for sharing on social media platforms, such as but not limited to, FACEBOOK, TWITTER, INSTAGRAM, LINKEDIN, GOOGLE+, YOUTUBE, TUMBLR, and SNAPCHAT and other custom configurations that may be defined by the user. Examples of such social media documents include profile photos, cover photos, header photos, banner images, standard logos, square logos, hero photos, background images, thumbnail photos, timeline shared images, news feed shared images, highlighted images, event images, "pins", and others.

System Overview

Referring to FIG. 1, an exemplary system 100 is illustrated. As shown, the system comprises any number of user devices (120a, 120b, 120n) operated by various users (e.g., administrators, employees, contractors, etc.) and accessing a server 110 via a network 130 (e.g., Internet, LAN, cellular, intranet, etc.). As discussed below, a user device may be any device capable of accessing the server 110, such as by running a client application or other software, like a web browser or web-browser-like application. Exemplary user devices include, but are not limited to, general purpose computers, desktop workstations, laptops, cell phones, smart phones, personal digital assistants, televisions, tablets, and the like.

The server 110 may be adapted to receive, determine, record and/or transmit information for any number of users. Such information may be manually entered or selected by a user via an online, mobile or desktop application. Such information may additionally or alternatively be automatically received from any of such devices. The server 110 may store received or determined information in, for example, a database 140.

In one embodiment, the server 110 may be connected to one or more third-party systems 150 via the network 130. Third-party systems 150 may store information in one or more databases that may be accessed by the server 110. Third-party systems 150 may include, but are not limited to, social networks and/or social media systems (e.g., Facebook, Twitter, LinkedIn, etc.), digital asset storage systems (e.g., Google Drive, iManage, Dropbox, Box, etc.), financial systems (e.g., billing, invoicing, and/or accounting systems), contact management systems, customer relationship management ("CRM") systems, project and/or task management systems, social media management and scheduling systems (e.g., Kapost, Buffer, and Hootsuite), communication systems, and others.

The server 110 may be capable of retrieving and/or storing information from third-party systems 150, with or without user interaction. Moreover, the server may be capable of transmitting stored information to third-party systems, and may notify users of such communications.

Figure 2:
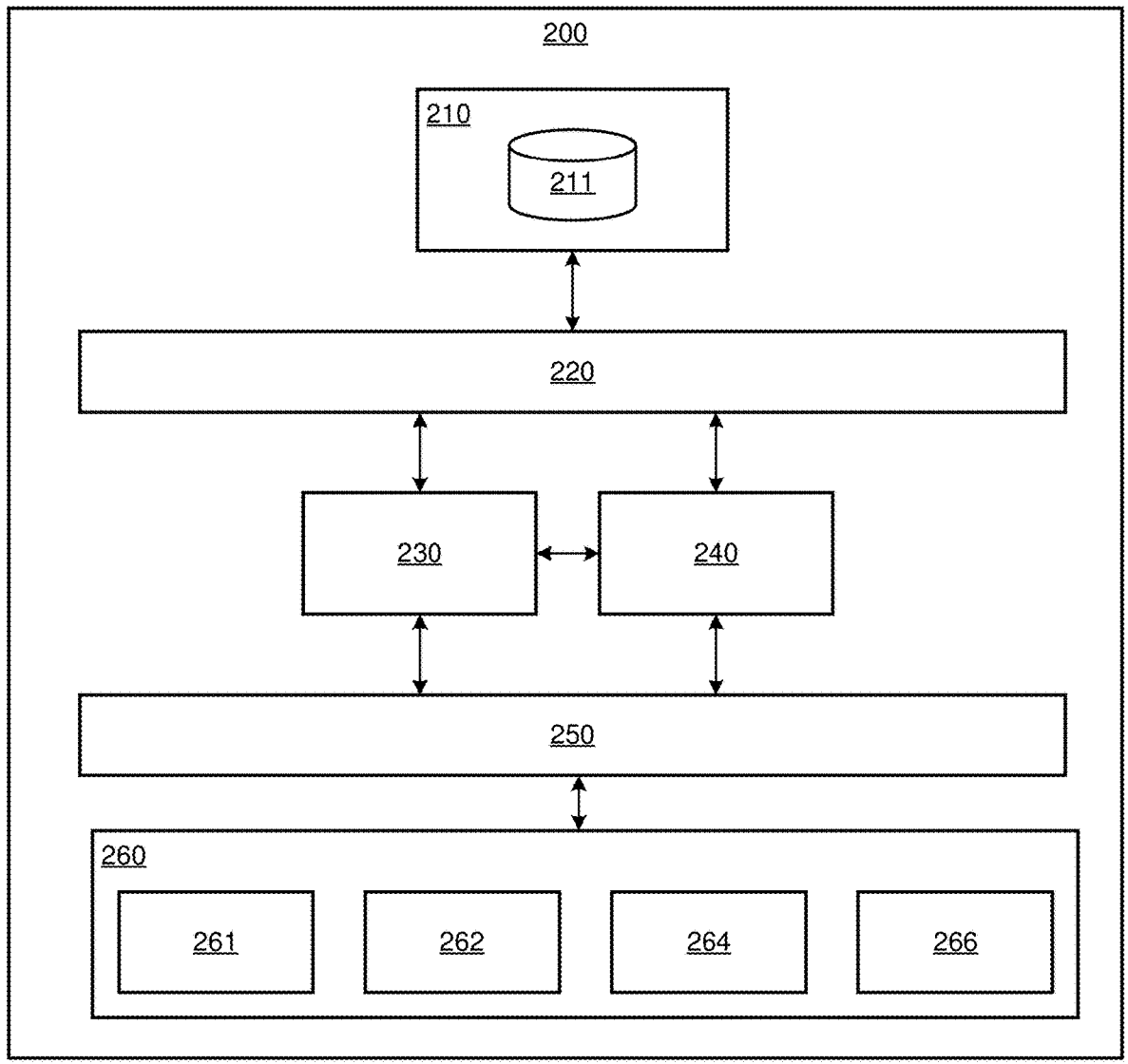
FIG. 2 is a block diagram that shows an exemplary server for use in a digital asset management, creation, and sharing system.

As shown in FIG. 2, the system may be entirely or partially implemented on one or more servers 200 each comprising hardware 260 such as any number of random access memory ("RAM") 261, processor modules 262, and internal or external memory 264. The server 200 may include a network interface 266 such that it may access the network to send or receive information.

The server 200 may access a central data store 210 having at least one database 211. It will be appreciated that the database 211 may be internal to the server 200 or may be accessed by the server over the network or via another wired or wireless connection. The server may store desired or required information in the database 210 and may access the same to retrieve the information.

In certain embodiments, the database 210 may be in communication with an object relational mapping ("ORM") 220, also known as an object relational model or object-relational database management system. The ORM may be in communication with a Universal Resource Indicator ("URI") 230 mapper and/or a Rest API generator 240.

The URI mapper 230 may map a URI into a pointer to an internal program, view, logic, or presentation of data within the system, based on one or more rules of a matching object specified in a collection of mapping objects. The URI mapper 230 may be in communication with a web server.

The Rest API 240 generator may be in communication with a web server as to send and/or receive data to/from user devices communicating with the server using HTTP and/or HTTPS. The Rest API 240 generator may prepare data stored in the database 210 for delivery to a client device or may prepare data received from a client device for storage in the database 210. The Rest API may be capable of translating between formats including, but not limited to JSON, XML and the like. The Rest API may be capable of automatically generating URIs based upon data structures observed in the ORM 220 for access by client devices.

A web server 250 may be adapted to deliver web pages on request to users using the Hypertext Transfer Protocol (HTTP and/or HTTPS) or similar protocols. This allows for delivery of HTML documents and any additional content that may be included by a document, such as images, style sheets and scripts.

In one embodiment, a user or client device may employ a web browser or similar client application to engage in communication with a web server 250. For example, a client application may make a request for a specific resource using HTTP/HTTPS and the web server may respond with the content of that resource or an error message if unable to do so. The resource may be data or a file stored in a database. The web server can receive content from a user, possibly using HTTP/HTTPS.

Figure 3:
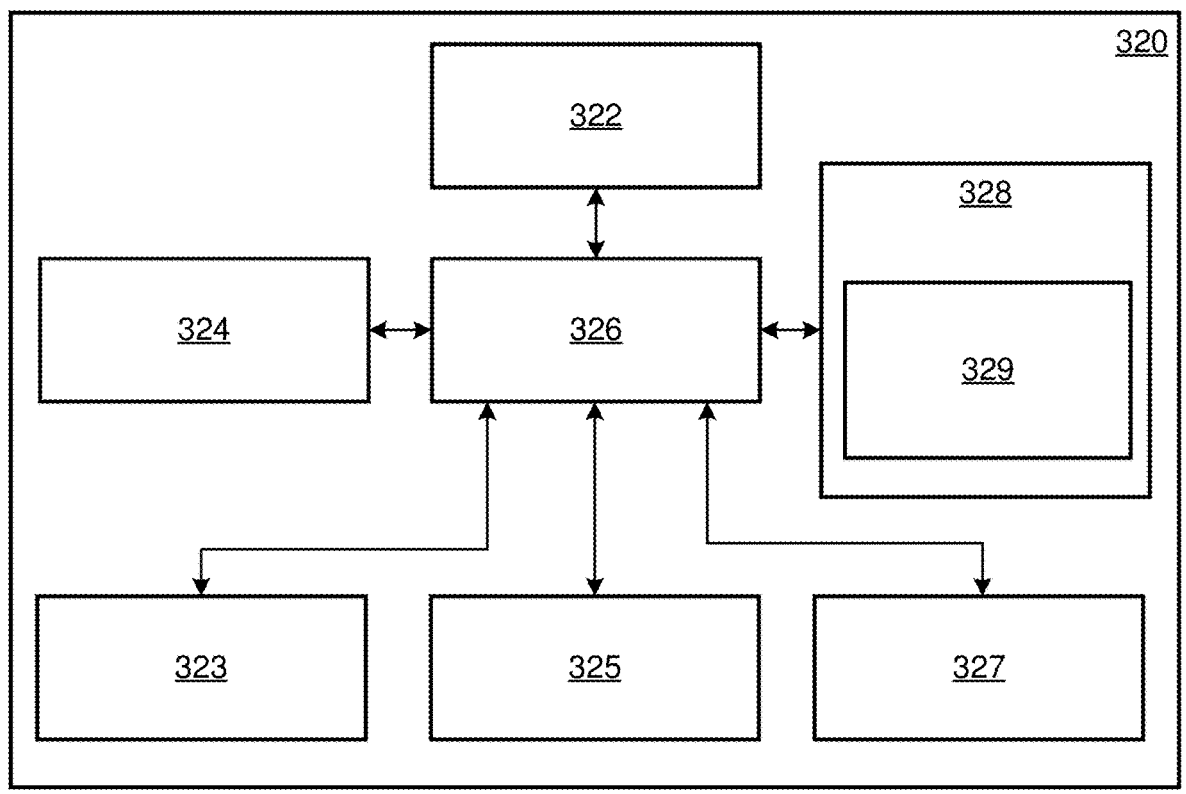
FIG. 3 is a block diagram that shows an exemplary user device for use in a digital asset management, creation, and sharing system.

Referring to FIG. 3, a user device 320 is illustrated. Exemplary user devices include, but are not limited to, general purpose computers, laptops, cell phones, smart phones, personal digital assistants, televisions, tablets, and the like.

As shown, the user device 320 may comprise one or more wireless and/or wired network interface modules 322, one or more camera modules 323, one or more display modules 324, one or more user input interfaces 325, one or more processor modules 326, one or more SIM/user associated modules 327, and/or one or more memory modules 328. Additional modules may include an input/output device, a location sensor, and/or audio equipment.

Each user device 320 may have one or more client applications 329 stored in its memory module 328 and executable by the processor module 326, where each client application 329 may be adapted to communicate with a digital asset management and document creation application running on the server 310 over, for example, a network. Additionally, or alternatively, the client applications 329 may be available as one or more web applications, accessible via the client device 320 having an internet browser. Such configurations may allow users of client applications 329 to input information and/or interact with the digital asset management and document creation application from any location that allows for access to the server 310.

As discussed in detail below, exemplary client applications 329 allow for the creation of documents in combination with visual identity compliance, digital asset management, and/or enterprise, workspace and user administration features. To that end, the client application may be adapted to present various user interfaces to users. Such user interfaces may be based on access privileges and/or information sent by the system, and may allow the user to send and receive data. Exemplary client applications may comprise HTML data, images, icons, and/or executable code. The executable code may be composed in JavaScript, ECMAscript, coffeescript, python, Ruby or other programming languages suitable for execution within the client application, or translation into a client application executable form.

It will be apparent to one of ordinary skill in the art that, in certain embodiments, any of the functionality of a client may be incorporated into the server, and vice versa. Likewise, any functionality of a client application may be incorporated into a browser-based client, and such embodiments are intended to be fully within the scope of this disclosure. For example, a browser-based client application could be configured for offline work by adding local storage capability, and a native application could be distributed for various native platforms via a software layer that executes the browser-based program on the native platform.

In one embodiment, communication between a client application and the server may involve the use of a translation and/or serialization module. A serialization module can convert an object from an in-memory representation to a serialized representation suitable for transmission via HTTP or another transport mechanism. For example, the serialization module may convert data from a native Python, Ruby, or Java in-memory representation into a JSON string for communication over the client-to-server transport protocol.

Similarly, communications of data between a client device and the server may be continuous and automatic, or may be user-triggered. For example, the user may click a button, causing the client to send data to the server. Alternately, a client application may automatically send updates to the server periodically without prompting by a user. If a client sends data autonomously, the server may be configured to transmit this data, either automatically or on request, to additional clients.

It will be recognized that any other suitable software, hardware or combinations thereof may be used with the exemplary systems and applications disclosed herein. Moreover, such applications may be implemented at any suitable location, such as but not limited to the server, a third party system, at one or more user devices or at a location not shown.

Digital Asset Management and Document Creation Application

Figure 4:
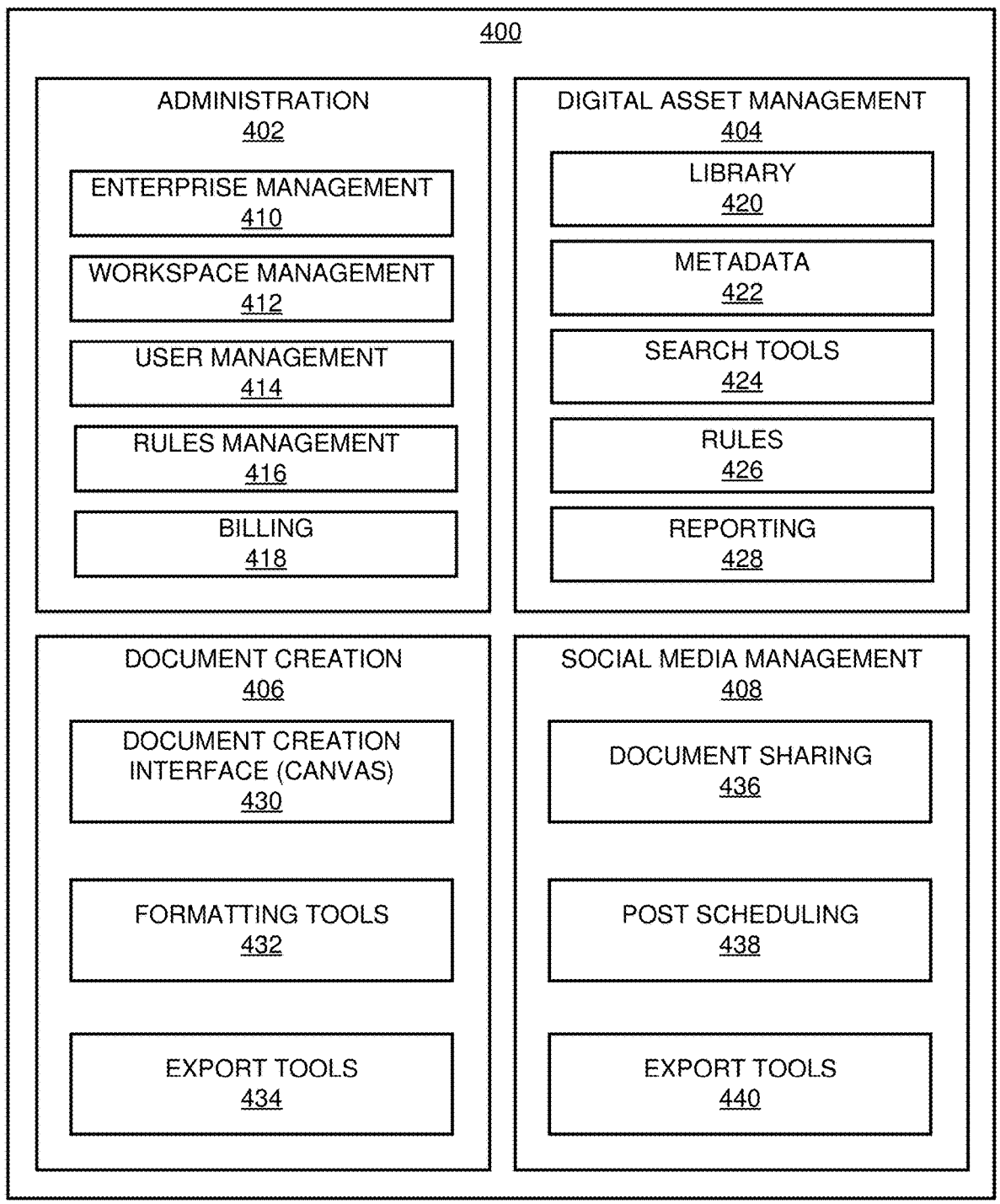
FIG. 4 is a block diagram that shows a number of integrated modules of a digital asset management, creation, and sharing application.

Referring to FIG. 4, a block diagram is presented showing a number of integrated modules of an exemplary digital asset management and document creation application 400. As shown, the application 400 may comprise an administration module 402; a digital asset management module 404; a document creation module 406 and a social media management module 408.

In one embodiment, the administration module 402 allows for the creation and management of enterprises 410 (i.e., client environments comprising multiple peer workspaces), workspaces 412 (i.e., individual environments adapted to meet the needs of departments, divisions, groups, etc. within an enterprise), and user accounts 414 having various levels of access to the application. This module further allows for the creation and management of enterprise-level and/or workspace-level rules 416 relating to the storing of digital assets and/or the creation of documents (e.g., rules relating to specific document content that may be used to create documents and/or the ways in which such content may used). Such rules may be enforced throughout the application 400, for example, by the digital asset management module 404 and the document creation module 406. In certain embodiments, the administration module 402 may further comprise billing functionality 418 to provide, for example, automated invoicing, billing and payment options to users of the application 400.

The application 400 may comprises a digital asset management module 404, which is generally adapted to allow users to upload, store, search, use, download and/or share digital assets in a library 420. This module may be further adapted to determine, receive and/or save metadata 422 relating to each of the digital assets stored therein, in accordance with any requirements of a workspace. Accordingly, in one embodiment, a metadata interface may be provided to allow users to add or modify metadata 422, such as but not limited to: asset usage rights, author, owner, upload date, download dates, expiration date, etc. It will be appreciated that, in some embodiments, such metadata may be automatically determined by the system and associated with digital assets.

The digital asset management module 404 may comprise search tools 424 allowing users to filter and/or search assets stored in the library 420 by enterprise, workspace, metadata and/or via the use of various keywords. This module may further comprise a rules 426 interface, which allows users to create asset-level rules, such as usage rules and/or alerts. For example, rules 426 may be created to alert users when specific events occur (or do not occur) (e.g., notifying users upon expiration of image rights, notifying an administrator when an asset is added or downloaded, and notifying an administrator when an asset is updated and/or modified).

Finally, the digital asset management module 404 may comprise reporting functionality 428 to allow users to view usage statistics and/or connections between various digital assets stored in the library. For example, a reporting dashboard may be provided to display the document contents used in a particular project or the documents associated with a particular project.

The application 400 may further comprise a document creation module 406 adapted to allow users to create, update and/or delete documents from projects comprising allowed document content. The document creation module 406 may comprise a document creation interface 430 (e.g., a project workspace with a canvas); document formatting tools 432 for creating documents tailored to specific use-cases (e.g., social media images, letterheads, etc.); and document export tools 434 for downloading documents and sharing documents (e.g., to social media networks and/or social media management tools).

Finally, the application 400 may further comprise a social media management module 408 to allow document sharing 436 directly to social media platforms and/or post scheduling 438 for future publication of documents. In one embodiment, the social media management module 408 may comprise export tools 440 to allow for exporting/posting documents to third-party social media management tools/environments.

Figure 5:
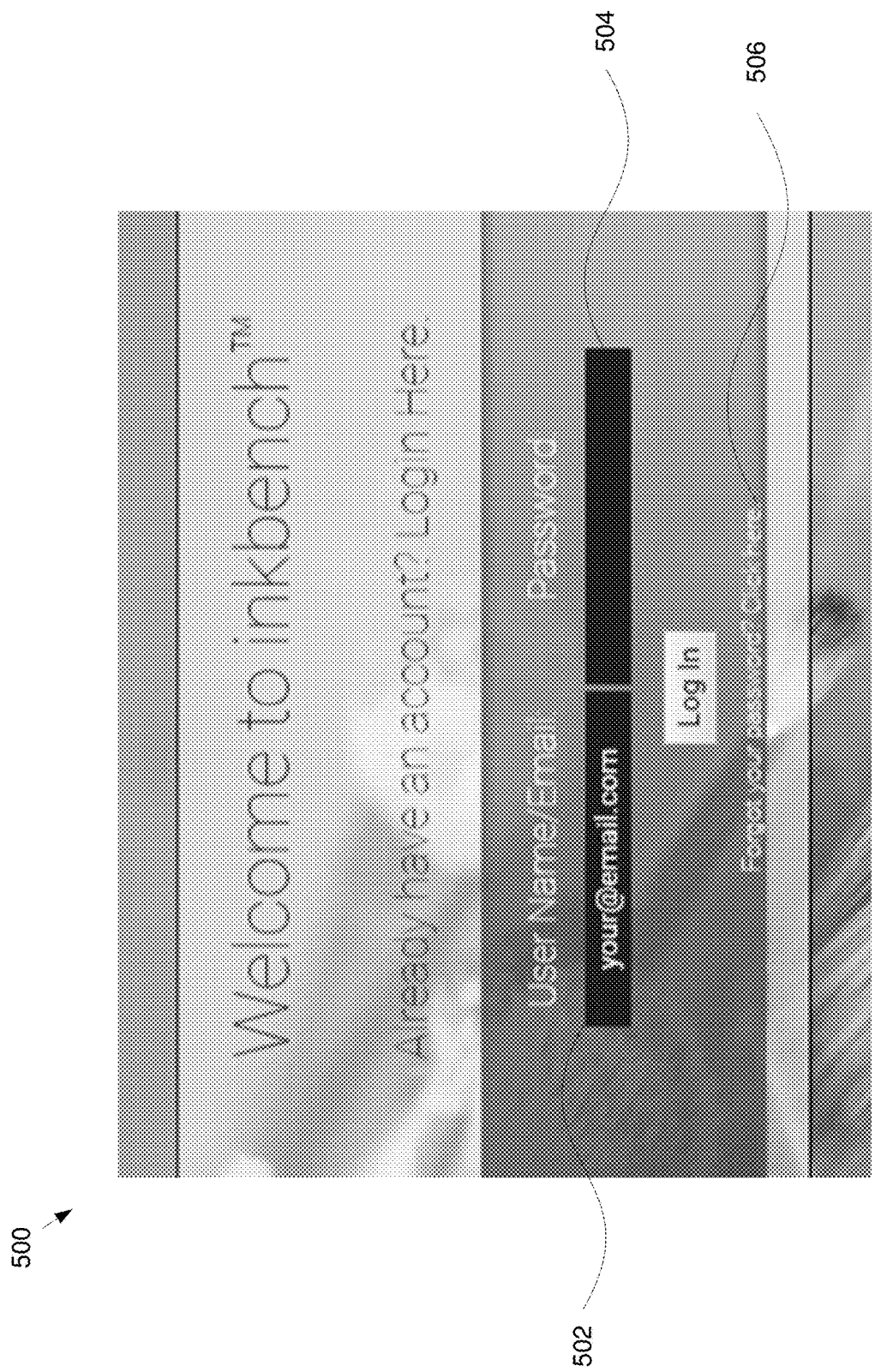
FIG. 5 is an exemplary login screen for the digital asset management, creation, and sharing application.

Referring to FIG. 5, an exemplary user login screen 500 for the digital asset management and document creation application is illustrated. A user may access the login screen 500 via, for example, a web browser. And a user may log into the application by entering a username 502 and a password 504.

The application may allow users to reset their passwords by clicking a link 506 on the login screen 500, entering an email addresses, receiving an email with a link to reset the password 504, and then navigating to a page to enter a new password.

Figure 6:
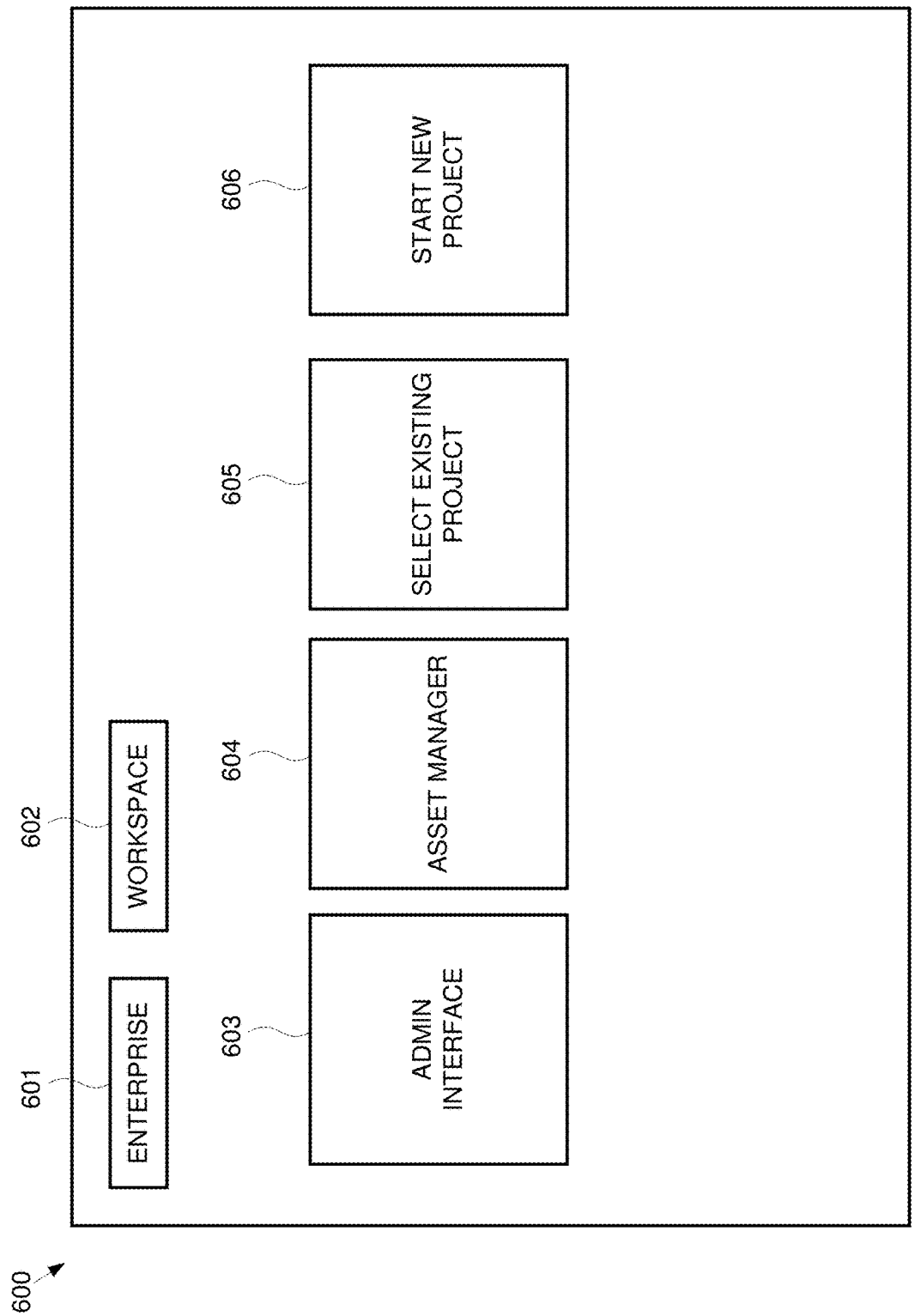
FIG. 6 is an exemplary navigation screen of the digital asset management, creation, and sharing application.

Referring to FIG. 6, an exemplary navigation screen 600 is illustrated. As shown, the navigation screen 600 provides a number of links to various screens of the application, including links to: an administration interface 603; a digital asset management interface 604; an existing project selection interface 605; and a project creation interface 606.

In certain embodiments, the navigation screen 600 may display an enterprise selection option 601 to allow a user to select an enterprise in which the user would like to work. As discussed below, the enterprise selection option may be available to a super enterprise user who has access to multiple enterprises.

The navigation screen 600 may also display a workspace selection option 602 to allow the user to select a workspace in which the user would like to work. The workspace may be selected from any number of workspaces that are associated with the selected enterprise and to which the user has access privileges.

Administration

Figure 16:
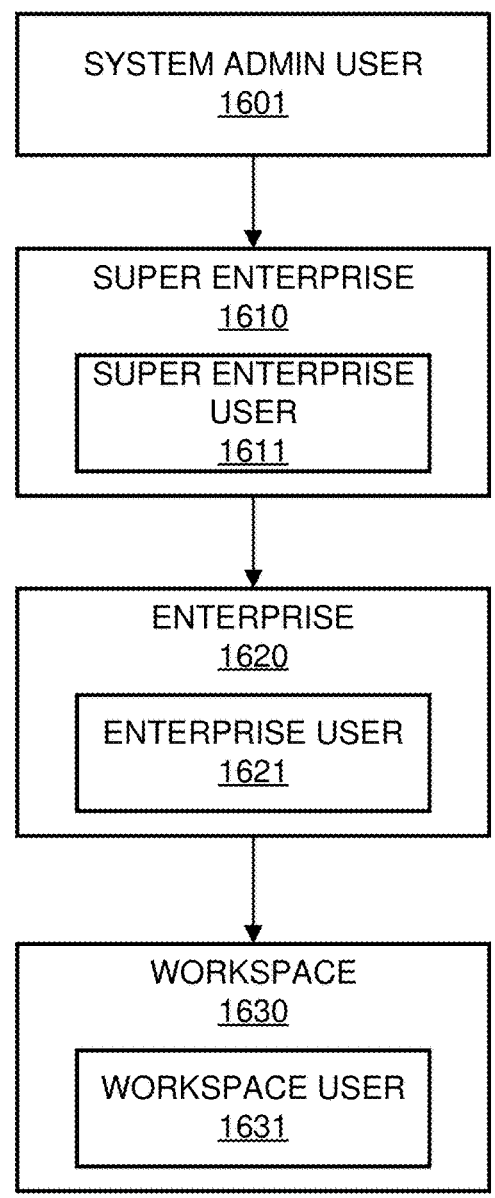
FIG. 16 is an exemplary system hierarchy diagram.

Referring to FIG. 16, an exemplary system hierarchy is illustrated. As shown, the application may comprise a number of environments or levels to which a user may be granted access, including: the entire system, a super enterprise, one or more enterprises and one or more workspaces. A system admin user 1601 may have access to all super enterprises 1610, enterprise 1620 and workspace 1630 environments within the application, with full rights. A super enterprise user 1611 may have access to multiple enterprises and each of the workspaces associated with such enterprises. An enterprise user 1621 may have access to multiple workspaces associated with the enterprise 1620. And a workspace user 1631 may have access to the digital assets associated with the workspace 1630 such that they may create, delete and/or edit projects within the workspace 1630 (subject to the rights the user has been granted).

At each level of the application there may be at least one administrator. Typically, but not necessarily, administrator rights will extend to all levels below the highest level to which the administrator has access. An administrator may establish new environments within the tool. For example, a system administrator may set up new super enterprises 1610, enterprises 1620, and workspaces 1630. As another example, a super-enterprise-level administrator may set up new enterprises and workspaces. And as yet another example, an enterprise-level administrator may set up new workspaces (and so on).

Administrators may also add, edit, and delete user rights. Configurable user rights may include the ability to delete projects and images; edit projects; add, edit, and/or delete metadata; and/or add, edit, and/or delete users/administrators up to their own level of access (peers or one level down). As an example, a system administrator may add, edit, and delete rights for users at the super enterprise, enterprise, and workspace levels. As another example, a super-enterprise-level administrator may add, edit, and delete rights for users at the enterprise and workspace levels. And as yet another example, an enterprise-level administrator may add, edit, and delete rights for users at the workspace level.

It will be appreciated that the above levels are exemplary and the program may comprise any number of levels to which a user or administrator may be granted access. For example, levels may exist below the workspace level 1630 and/or above the system level 1601. Moreover, it will be appreciated that the terms "workspace," "enterprise," "super enterprise," and "system" are exemplary and are used herein for convenience.

Figure 7:
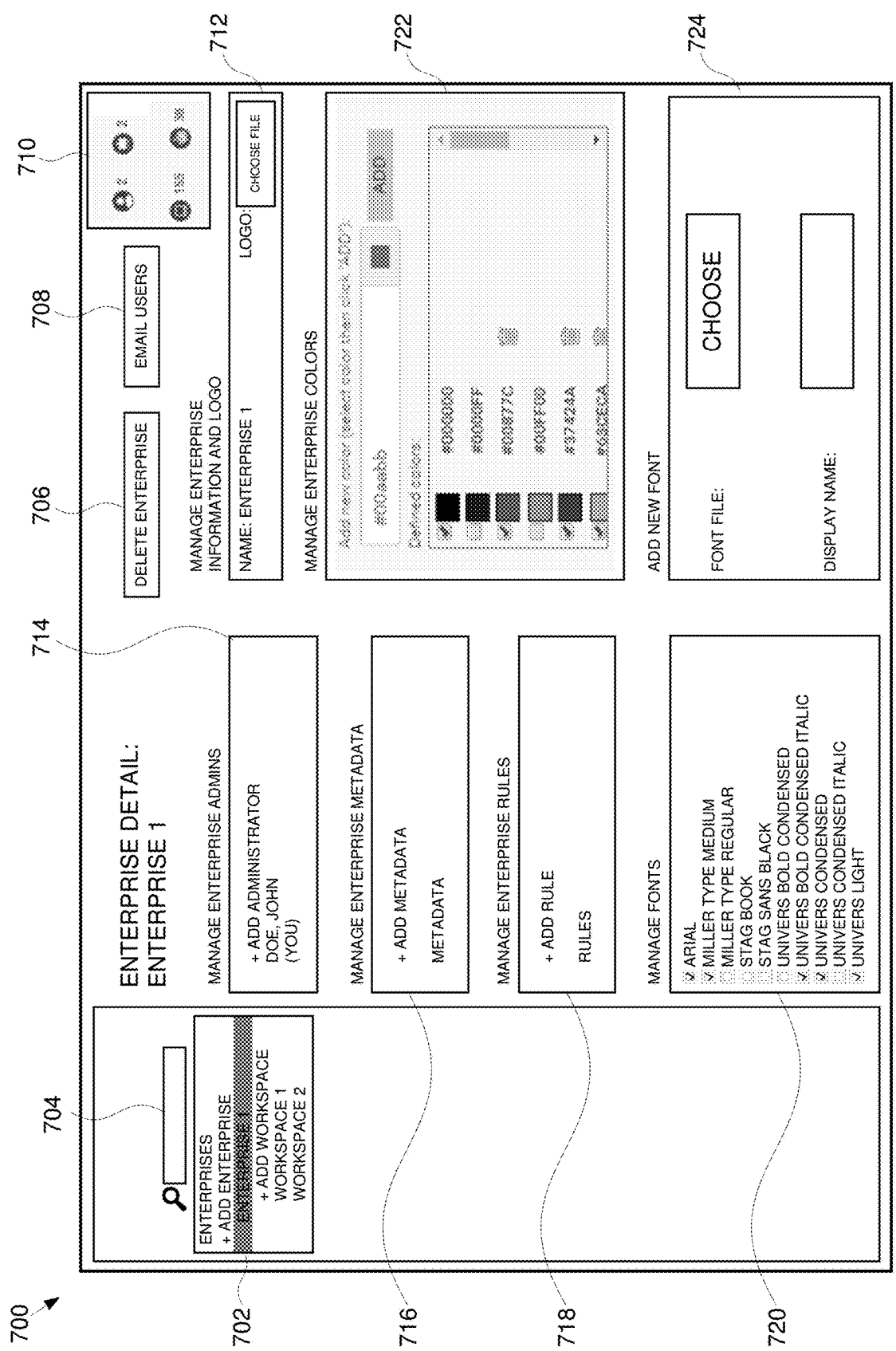
FIG. 7 is an exemplary enterprise administration screen of the digital asset management, creation, and sharing application.

Referring to FIG. 7, an exemplary enterprise administration screen 700 is illustrated. Generally, this screen provides various enterprise-level administration options that may be configured by a user. The enterprise administration screen 700 may be accessed by, for example, selecting the "Admin Interface" option 603 on the navigation screen 600 (see FIG. 6).

As shown the enterprise administration screen 700 comprises a searchable list of enterprises 702 stored in the system. A user may select one of the listed enterprises 702 to manage administration options to which they have been conferred privileges associated therewith. If multiple enterprises are available, the user may search for a particular enterprise using a search bar 704. Alternatively, a user conferred with the appropriate rights and permissions may add a new enterprise by, for example, selecting an "Add Enterprise" option.

Once an enterprise 702 is selected (or a new enterprise is created), a number of administration options may be presented to the user, including options to delete the enterprise 706 and to email all users 708 associated with the enterprise. The screen may display enterprise statistics and/or analytics 710, such as the number of users in the enterprise, the number of workspaces associated with the enterprise, the number of projects associated with the enterprise and/or the number of documents associated with the enterprise.

The enterprise administration screen 700 comprises an enterprise information section 712, which allows for enterprise information to be input and/or uploaded into the system. Enterprise information may include, but is not limited to: name, logo, images, contact information (e.g., email address, physical address, mailing address, phone number, etc.), and/or billing information (e.g., credit card information, billing address, tax information etc.).

In one embodiment, the enterprise administration screen 700 comprises an enterprise user management section 714. The user management section 714 allows for users to be added to, updated, removed from and/or otherwise associated with a given enterprise. Generally, each enterprise user may be associated with user information, and such information may be entered into the system via the user management section 714. Exemplary user information may include, but is not limited to: user identification information (e.g., name, unique ID, username, password, etc.); contact information (e.g., email address, physical address, phone number, etc.); employment information and/or (e.g., employment status, employment type, title, etc.). And such information may be entered into the system via the user management section 714.

It will be appreciated that an enterprise admin users may, if given the appropriate rights and permissions, add, edit, and delete enterprise user rights via the user management section 714. Configurable user rights may include the ability to create and manage the enterprise, workspaces, projects, templates, documents and other digital assets associated with the enterprise.

The enterprise administration screen 700 may further comprise an enterprise metadata management section 716. This section allows users to create, modify and/or delete enterprise-level metadata fields that may be assigned to each of the digital assets that are stored in the digital asset management system and that are associated with the enterprise (e.g., with workspaces associated with the enterprise). In one embodiment, an enterprise-level metadata field may be set to a particular value for all of the digital assets associated with the enterprise. In other embodiments, the value of an enterprise-level metadata field may be entered and/or determined for each associated digital asset. In this embodiment, the metadata field may be allowed (e.g., a value may be entered for the metadata field) and/or required (e.g., all digital assets associated with the enterprise must comprise a value for the metadata field).

In certain embodiments, the administration screen 700 may comprise a rules section 718, where an enterprise admin user can create, update and/or delete rules governing various aspects of digital asset management and document creation.

Any number of rules may be implemented to govern allowable, required and/or forbidden digital assets that may be stored and/or accessed in the digital asset management system. For example, only specific types of digital assets may be stored in the system (e.g., projects, templates, documents, and document content). As another example, only document content having specific file formats may be allowed (e.g., PDF, JPG, PNG, etc.). As yet another example, only those digital assets that may be incorporated into a project (i.e., added to a canvas) will be displayed to a user in a view of the digital asset management system that is presented within the document creation interface.

Rules governing various aspects of projects, templates and/or documents may also be implemented. In one embodiment, rules relating to sections, layers, margins, paddings, borders, colors, fonts and/or other general properties of such assets may be implemented. As an example, a header section, footer section and/or body section may be required.

As another example, the illustrated embodiment shows font-based rules. As shown, a user may select preferred or available fonts in a font management section 720. Such fonts may then be made available to users in the document creation interface. If a desired font is not already stored in the system, the user may upload one or more font files using an 'add new font' section 724 and enter a name for the font to be displayed by the system. Once a new font is uploaded, that font will be made available to enterprise users via the document creation interface. Optionally, a rule may be created to prevent all users associated with the enterprise from using fonts that are not selected in the font management section 720.

As yet another example, the illustrated embodiment shows color-based rules. As shown, a user may select preferred or available colors in a color management section 722. Once selected, such colors may be made available to enterprise users in the document creation interface.

In one embodiment, rules may be implemented to govern the allowable, required and/or forbidden digital assets that may be included in projects, templates and/or documents. Generally, the restriction or allowance of digital assets may be based on any metadata associated with the digital asset. For example, rules may be created to allow or restrict specific types of digital assets that may be included in projects, templates and/or documents (e.g., images, videos, text boxes, shapes, logos, etc.). As another example, digital assets may be allowed or restricted based on their specific colors, usage rights, dimensions, etc.

One or more rules may be implemented to govern allowable, required and/or forbidden positions and/or sizes of assets within projects, templates and documents. As used herein, the position of an asset may refer to any of the following: absolute position of the asset, a relative position of the asset to any other assets; layers within which the asset may reside; and/or sections within which the asset may be placed. The size of an asset may refer to an absolute size and/or a relative size of the asset to any other assets and/or the overall document size.

As an example, a "background" image may be restricted to a background layer, and all other assets may be displayed on top of the background asset. As another example, a "footer" or "header" image may only be added within the footer or header sections of a document, respectively. As yet another example, a first asset may only be added to a document if it is located within a predefined distance from a second asset. And as yet another example, a certain asset may not be added to a document if that document already contains another asset having the same asset type.

In another embodiment, rules may be implemented to govern allowable, required and/or forbidden properties of documents outputted by projects or templates. For example, a rule may specify that only documents of predetermined dimensions (i.e., having specific dimensions and/or having dimensions that fall within a range of allowable dimensions) may be output from projects. As another example, a rule may specify that outputted documents must be one of a number of allowable formats.

In one embodiment, a notification rules may be implemented, which allow users to be notified when specific events occur (or do not occur). For example, a rule may be created to notify one or more users when a project is created and/or a document is output from a project. As another example, a notification may be sent to one or more users when an image rights expiration date is approaching or has passed. As yet another example, a rule may be created to notify one or more users when an asset is downloaded and/or when the asset's metadata is modified.

It will be appreciated that the displayed enterprises and/or the ability to interact with various enterprise administration options may be based on the administrative privileges associated with the user. For example, an "admin" enterprise user may be allowed to edit the various options present on the enterprise administration screen 700, while a "regular" enterprise user may not have such privileges.

Figure 8:
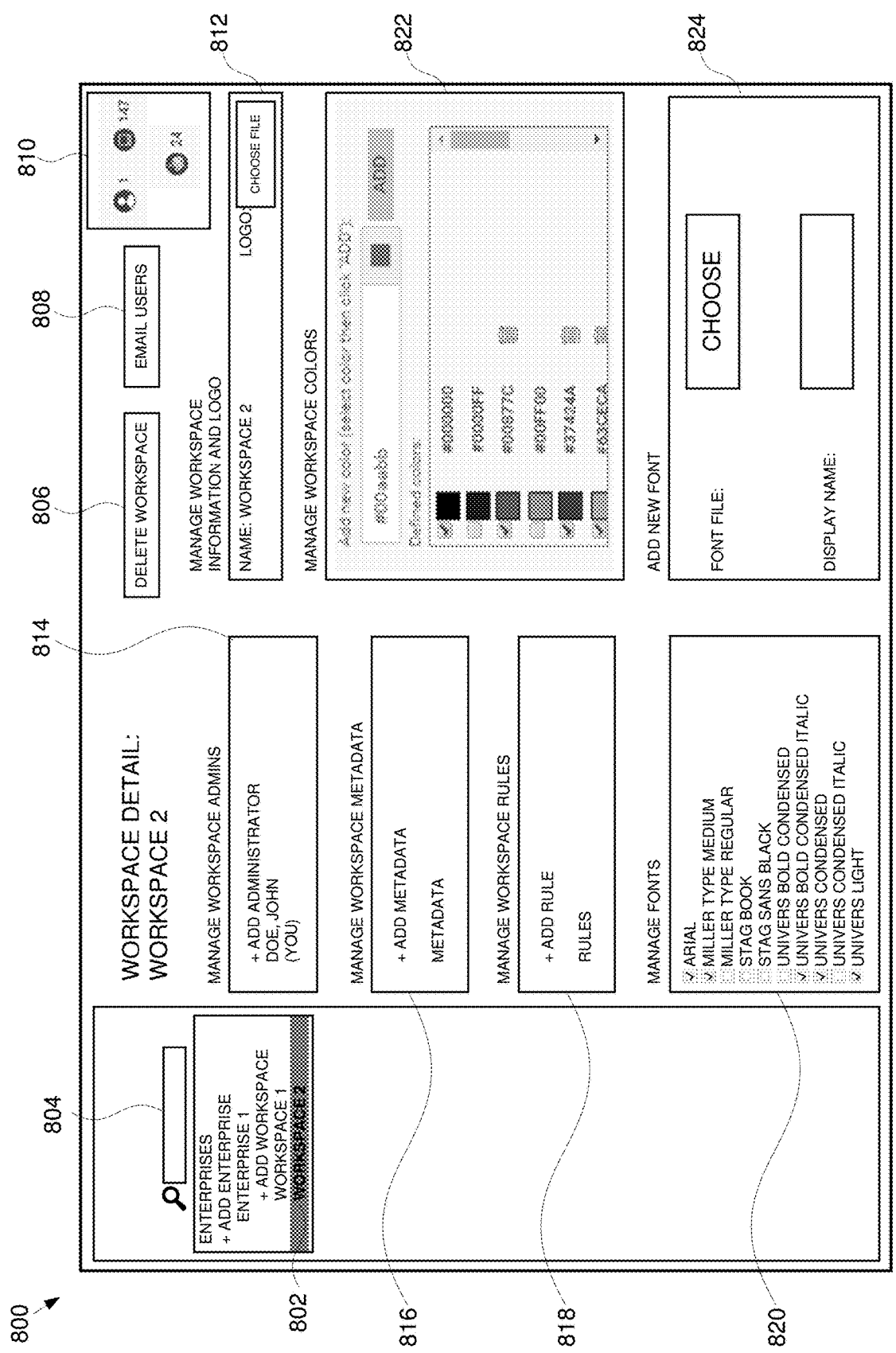
FIG. 8 is an exemplary workspace administration screen of the digital asset management, creation, and sharing application.

Referring to FIG. 8, an exemplary workspace administration screen 800 is illustrated. As shown, this screen is similar to the enterprise administration screen 700, and provides various workspace-level administration options that may be configured by a user.

As shown the workspace administration screen 800 comprises a searchable list of workspaces 802 stored in the system. A user may select one of the listed workspaces to manage administration options associated therewith. If multiple workspaces are available, the user may search for a particular workspace using a search bar 804. Alternatively, in certain embodiments, a user may add a new workspace by, for example, selecting an "Add Workspace" option.

Once a workspace is selected (or a new workspace is created), a number of administration options may be presented to the user, including options to delete the workspace 806 and to email all users 808 associated with the workspace. The screen may display workspace statistics and/or analytics 810, such as the number of users in the workspace, the number of projects associated with the workspace and/or the number of documents associated with the workspace.

The workspace administration screen 800 comprises a workspace information section 812, which allows for workspace information to be input and/or uploaded into the system. Workspace information may include, but is not limited to: name, logo, images, contact information (e.g., email address, physical address, mailing address, phone number, etc.), and/or billing information (e.g., credit card information, billing address, tax information etc.).

In one embodiment, the workspace administration screen 800 comprises a workspace user management section 814. The user management section 814 allows for users to be added to, updated, removed from and/or otherwise associated with a given workspace. Generally, each workspace user may be associated with user information, and such information may be entered into the system via the user management section 814. Exemplary user information may include, but is not limited to: user identification information (e.g., name, unique ID, username, password, etc.); contact information (e.g., email address, physical address, phone number, etc.); employment information and/or (e.g., employment status, employment type, title, etc.). And such information may be entered into the system via the user management section 814.

It will be appreciated that workspace admin users with appropriate rights and permissions may also add, edit, and delete workspace user rights via the user management section 814. Configurable user rights may include the ability to create and manage projects, templates, documents and other digital assets associated with the workspace.

The workspace administration screen 800 may further comprise a workspace metadata management section 816. This section allows users to create, modify and/or delete workspace-level metadata fields that may be assigned to each of the digital assets that are stored in the digital asset management system and that are associated with the workspace. In one embodiment, a workspace-level metadata field may be set to a particular value for all of the digital assets associated with the workspace. In other embodiments, the value of a workspace-level metadata field may be entered and/or determined for each associated digital asset. In this embodiment, the metadata field may be allowed (e.g., a value may be entered for the metadata field) and/or required (e.g., all digital assets associated with the workspace must comprise a value for the metadata field).

Generally, each workspace associated with an enterprise will inherit the enterprise-level metadata requirements. Each workspace may also, include additional workspace-level metadata requirements. It will be appreciated that workspace-level metadata fields may not conflict with enterprise-level metadata fields. In other words, enterprise-level metadata fields may not be removed at the workspace level, but workspace-level metadata fields may be created in addition to enterprise-level metadata fields.

Similarly, a document associated with a workspace must include the enterprise-level and workspace-level required metadata to be available to all workspace users. Accordingly, workspace users can import documents from other enterprise workspaces into their workspace by updating the metadata as needed to meet all enterprise-level and workspace-level metadata requirements. Generally, all users within an enterprise may search for digital assets associated with any of the enterprise's workspaces using keyword search capability offered within the application.

In certain embodiments, the workspace administration screen 800 may comprise a rules section 818, where a workspace admin user can create, update and/or delete rules governing various aspects of digital asset management and document creation.

It will be appreciated that any of the rules described above in reference to the enterprise administration screen 700 may be implemented at the workspace level via the workspace rules section 818. Workspace-level rules may be created in addition to any inherited enterprise-level rules, as long as the workspace-level rules do not conflict.

It will further be appreciated that the displayed workspace information and/or the ability to interact with various workspace administration options may be based on the administrative privileges associated with the user. For example, an "admin" workspace user may be allowed to edit the various options present on the workspace administration screen, while a "regular" workspace user may not have such privileges. Workspace administrators may also create project templates incorporating "locked" graphic, branding and text elements that allow a user to quickly and easily create branding and or campaign compliant assets.

Digital Asset Management

Figure 9:
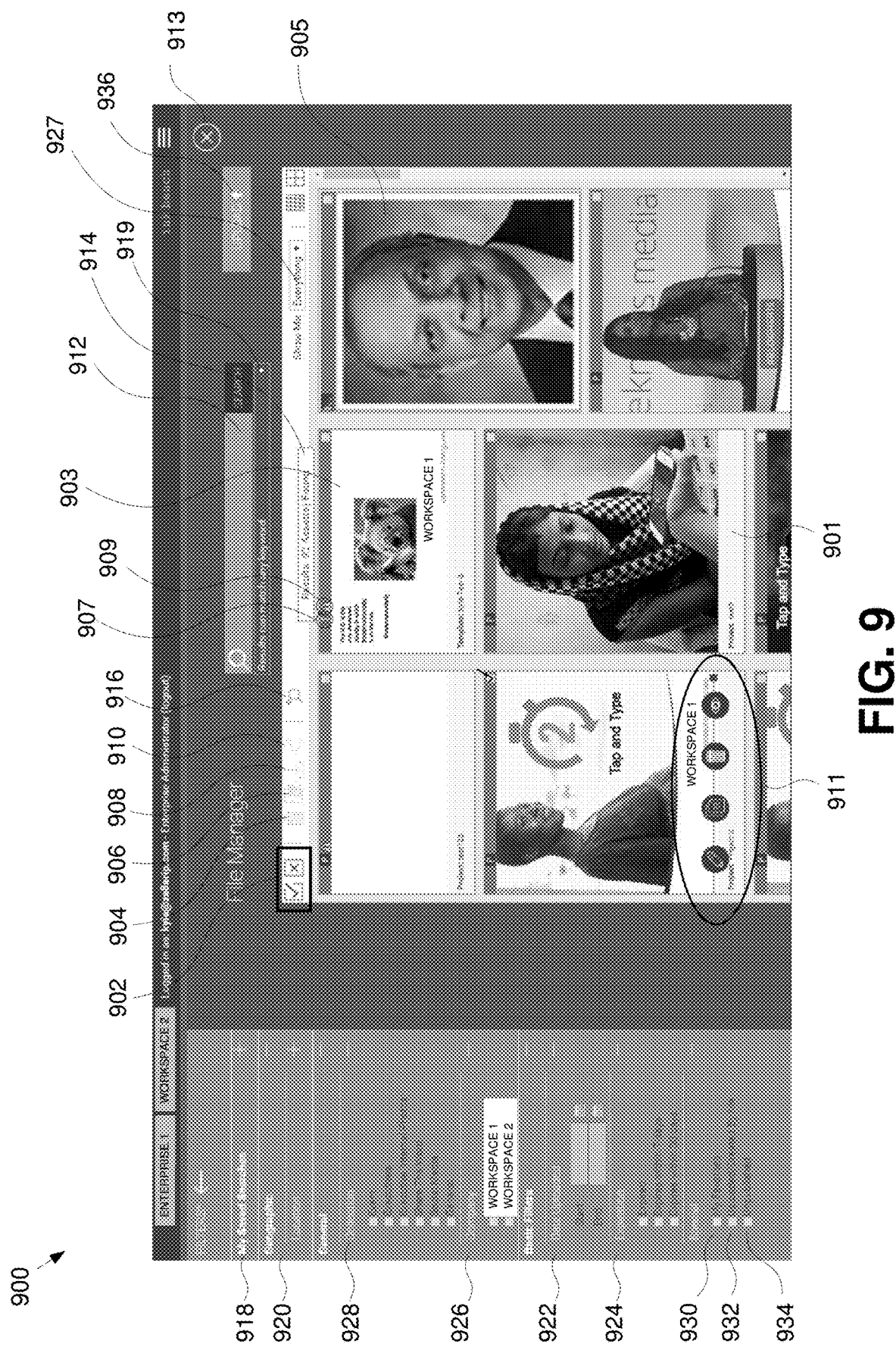
FIG. 9 is an exemplary digital asset list screen of the digital asset management, creation, and sharing application.

Referring to FIG. 9, an exemplary digital asset list screen 900 is illustrated. This screen may be accessed by, for example, choosing the "Asset Manager" option presented on the navigation screen (see FIG. 6 at 604). The digital asset list screen 900 is generally adapted to allow users to view, search, use, download, share, upload and/or publish digital assets.

As shown, the digital asset list screen 900 comprises a searchable library of digital assets, including projects (e.g., project 901), templates (e.g., template 903), documents, and various document content (e.g., image 905). A preview of each asset may be displayed along with icons indicating the type 907 and publication status 909 of each asset. At any time, the user may close the digital asset list screen 900 by clicking a close button 913.

Any number of assets may be selected all at once using a group of selection tools 902 or individually by checking a checkbox at the top right of the asset. Once an asset is selected, a number of options may be presented to the user including options to: delete the selected asset(s) 904, add metadata to the selected asset(s) 906, download the asset(s) 908, publish the asset(s) to one or more workspaces, share the asset(s) 910, view and/or edit metadata associated with the asset(s), open the asset(s) (e.g., open a project or template in the document creation interface), and/or duplicate the asset(s). Individual assets may be edited, duplicated, deleted, or their metadata viewed through a hover menu 911.

As shown, the digital asset list screen comprises search functionality allowing users to search for digital assets stored in the library. For example, a search bar 912 may be presented to allow users to search for assets via keyword or asset name. Upon partial or complete search input, the search bar may provide predictive suggestions based on related searches and/or past searches. As shown, a results area 914 displays the number of assets matching given search criteria. And, a save search button 916 may allow searches to be stored in the system and viewed at a later time through a "My Saved Searches" filter 918. The user may utilize a keyword matching menu 919 to select whether the search results can match any of the keywords entered in the search bar 912 or all of the keywords entered in the search bar 912.

In certain embodiments, the digital asset list screen 900 displays a number of asset metadata filters 918-934 that may be selected by users in order to filter the displayed list of assets. Generally, the filters may relate to workspace- and/or enterprise-level metadata associated with the digital assets, and the filters may be automatically generated and displayed based on such metadata. Exemplary filters may include, but are not limited to, asset type 927 (e.g., everything, projects, templates, documents, and/or document content); predefined associations and collections 928 (e.g., "brand elements," "executives," "icons," "logos," "molecules," "people," and "scientists"); file type; geographic location 920; upload dates 922; creation dates; last used date; license expiration date 924; company 926; rights/status (expired, licensed for all audiences, licensed for web, model releases available, etc.) and/or visual properties (e.g., transparency value, colors, fonts, etc.). In one embodiment, a "My Favorites" filter 930 may be provided to allow users to view the assets that they have favorited (see FIG. 10 at 1004). Additionally, an "Uploaded/Created by Me" filter 932 may be provided to allow users to view the assets that they have uploaded or created. Additionally, an "Unpublished" filter 934 may be provided to allow users to view any assets that have not yet been published to a workspace.

It will be appreciated that the displayed assets and/or the available options to interact with assets may be based on the enterprise, workspace, users and/or publication status associated with each asset. For example, the displayed assets may include those that are associated with the workspace in which the user is currently working. Additionally or alternatively, the listed assets may only include those that have been published to the workspace and/or those that are owned by the user.

Finally, an upload button 936 may be provided to allow a user to upload one or more digital assets to the system. Upon selection of the upload button 936, an upload screen may be displayed, such as the exemplary upload screen 1200 illustrated in FIG. 12.

Figure 12:
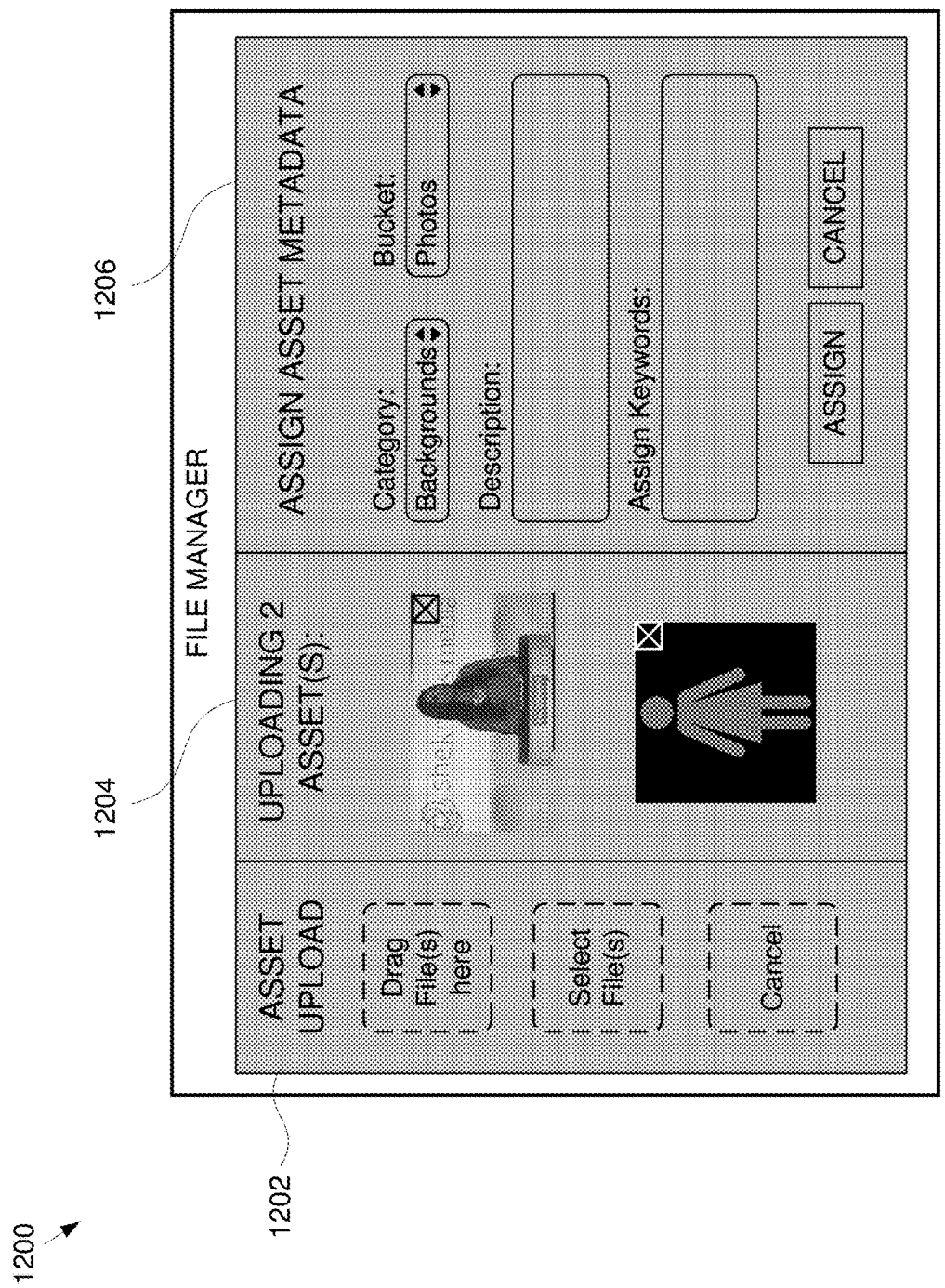
FIG. 12 is an upload screen showing options for uploading any number of assets and applying metadata to the same.

Referring to FIG. 12, one or more digital assets may be uploaded through an upload screen 1200. The assets may be uploaded by dragging files to an upload pane 1202 or by selecting local or remote files via a file selection interface. Once uploaded, a preview pane 1204 may show a thumbnail of the uploaded assets, any of which may be individually removed from the preview pane 1204.

In certain embodiments, metadata may be automatically determined by the system and/or manually inputted for the uploaded assets through a metadata assignment pane 1206. As discussed below, any required and/or allowable metadata may be input for the assets. For example, the uploaded assets may be assigned to a 'backgrounds' category and a 'photos' bucket. Additionally, a written description and one or more keywords may be assigned to the uploaded assets in the metadata assignment pane 1206. Once the metadata is determined or entered, the user may associate the metadata with the uploaded assets and such assets may be stored in the digital assets management system.

In one embodiment, assets may be immediately available to the user uploading the assets, but will only be available to workspace users once the required metadata for one or more workspaces has been provided. The system may be configured to alert the user to any missing metadata that may be required to make an asset available to the users of a workspace.

Figure 10:
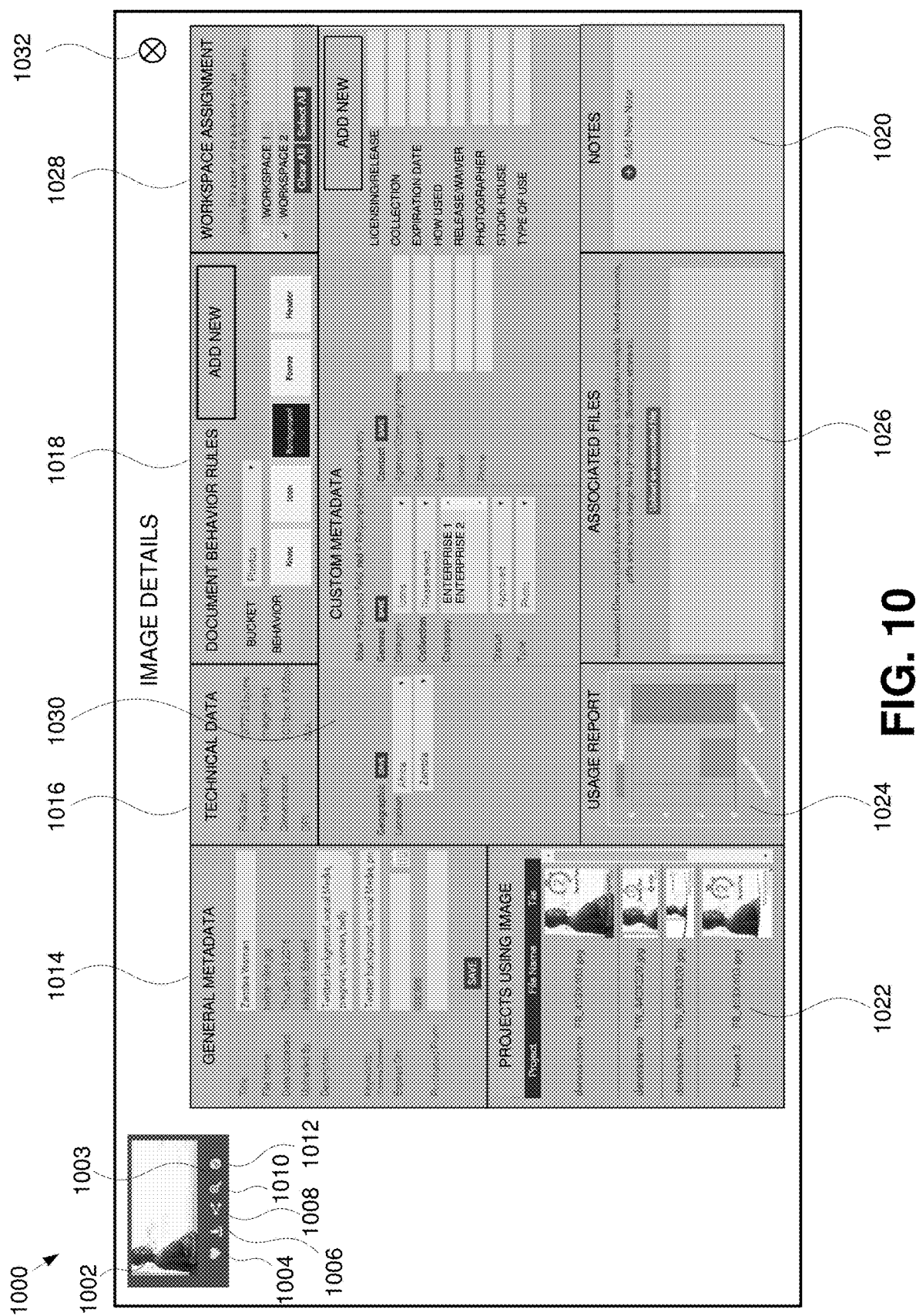
FIG. 10 is an asset details screen showing an exemplary image stored in the digital asset management, creation, and sharing system.

Referring to FIG. 10, an asset details screen 1000 is shown for an exemplary image stored in the system. This screen may be accessed by, for example, selecting an asset and choosing the option to view and/or edit metadata associated with the asset on the digital asset list screen 900. Generally, the asset details screen 1000 allows authorized users of the workspace to create and manage metadata associated with an asset.

As shown, a left sidebar of the details screen may show a thumbnail 1002 of the asset. A number of additional options 1003 may be available beneath the thumbnail 1002, including options to: add the asset to a user's favorites list 1004, download the asset 1006, share the asset 1008 (e.g., via email or social media), zoom into the asset 1010, and/or publish the asset 1012.

The asset details screen 1000 may comprise a general metadata section 1014 that displays asset metadata such as: title, file name, date uploaded, name of user who uploaded the asset, description, keywords, expiration date, and/or the vendor from whom the image was purchased. The asset details screen 1000 may also comprise a technical data section 1016 including such information as: file size, file media (MIME) type (e.g., image) and sub-type (e.g., JPEG, PNG, BMP, TIFF, etc.), dimensions, resolution, and dots per inch (DPI). For other types of assets, examples of file media types may additionally include, but are not limited to audio, font, image, message, multipart, text, video, photo, logo, and infographic. The asset details screen may also provide asset usage details (e.g., frequency of use, users who download the asset, etc.).

It will be appreciated that the general metadata section may comprise metadata fields that are unique to a given digital asset type. For example, an image asset may comprise "date uploaded" metadata, while a project asset may comprise "date created" metadata. Of course, assets may have overlapping metadata fields, even if they are of different types (e.g. name, file type, date modified, etc.).

The asset details screen 1000 may further comprise a custom metadata section 1030 displaying a number of custom metadata fields. Such custom metadata may comprise (1) enterprise-level custom metadata inherited from an enterprise associated with the asset (see FIG. 7); (2) workspace-level custom metadata inherited from any number of workspaces associated with the asset (see FIG. 8); and (3) asset-level custom metadata created by one or more users.

Enterprise-level and workspace-level custom metadata may be automatically determined by the system and/or manually entered by an enterprise admin (via the enterprise administration screen) or a workspace admin (via the workspace administration screen). Generally, a regular user may not edit or delete custom metadata having a value set at the enterprise-level or the workspace-level, unless the user is granted such rights by an admin user.

Asset-level metadata may generally be created, updated and/or deleted via the custom metadata section. In one embodiment, asset-level custom metadata created by a first user may not be edited or deleted by a second user for a given workspace, unless granted such rights by the first user or an admin. However, as discussed above, a user associated with another workspaces may view/copy assets from a first workspace into a second workspace to which they are assigned, as long as the metadata requirements of the second workspace are met.

Exemplary custom metadata fields may include geographic location, category, collection, company, status (e.g. draft, approved, or any custom status), type of asset, contact information for media publisher/author (e.g. individual/company name, department, email, owner, phone), photographer, intended usage (e.g. print, website, social), licensing/release information, and expiration data.

The asset details screen may further comprise a rules section 1018 displaying a number of rules. Such rules may comprise (1) enterprise-level rules inherited from an enterprise associated with the asset; (2) workspace-level rules; and (3) asset-level rules created by one or more users.

As explained above, enterprise-level and workspace-level rules may be set by an administrator via the enterprise administration screen and/or workspace administration screen. Generally, a regular user may not edit or delete these rules.

Asset-level rules, on the other hand, may be created, updated and/or deleted via the rules section 1018. In one embodiment, asset-level rules created by a first user may not be edited or deleted by a second user, unless the user is granted such rights by the first user or an admin.

Asset-level rules may include any of the rules described above in reference to the rules section 718 of the enterprise administration screen 700. As shown in the illustrated embodiment, the rules section 1018 allows a user to assign the asset to one of a number of "buckets" (i.e., collections or groupings of like assets). One such bucket is designated "locked branding elements," and assets assigned to this bucket may be prevented from further modification. Other elements can also be loaded as part of the project template creation process.

The rules section may also allow the user to select the "behavior" of an asset from a number of possible behaviors stored in the system (e.g., "no behavior," "icon," "background," "content type," "position," "footer," "header," and/or others). The behavior of the asset may determine how that asset may be used in a project or how it will be treated by other assets when included in a project. For example, a "background" behavior may cause an asset to automatically be applied as a background layer when added to a project canvas, and all other assets may be displayed on top of the background asset. As another example, a "footer" or "header" behavior may cause the asset to be automatically displayed within the "footer" or "header" position of a project canvas, respectively. In other words, an asset assigned a "footer" behavior may only be added within the footer section of the canvas.

Still referring to FIG. 10, the asset details screen may comprise a publication option 1012 to allow a user to publish an asset (i.e., to make an asset available to other users of the system). Assets may be published by workspace, enterprise, super enterprise and/or administrator in the current workspace or in multiple workspaces, as long as metadata requirements for each workspace are met.

In certain embodiments, the user may need to enter certain required metadata before an asset may be published to one or more workspaces. For example, a user may need to set a name or title, keywords, an asset type and/or behavior before an asset may be published. As discussed above, required asset metadata may be created and/or modified via, for example, the enterprise administration and/or workspace administration screens (see FIGS. 7 and 8). Accordingly, if a user desires to publish an asset to multiple workspaces, the user may need to enter all of the metadata required by each of the workspaces and the metadata required by the enterprise to which the workspaces belong.

The asset details screen 1000 may comprise a workspace assignment section 1028, which allows a user to view and/or modify the asset's availability for use in various workspaces of the enterprise. In certain embodiments, digital assets may be automatically associated with the workspace that is selected at the time the asset is uploaded. Although not shown, an option may be displayed to allow a user to associate the digital asset with all existing and/or later-created workspaces. An option to present all workspace administers with assets newly added to other workspaces may be made available to allow such administrators to make the asset available to their users.

A reporting section of the asset details screen 1000 allows a user to view usage information of the asset in various projects and/or templates. Usage information can be shown as a list of projects using the asset 1022, wherein the list includes project names, file names for the versions of the asset used in the respective projects, and a thumbnail tile showing the asset as it is used in the respective projects. The usage information may also be shown in a graph view 1024 showing how many times the asset was downloaded or used in projects. Usage information may provide insights into an asset's popularity. Usage information may also include, but not be limited to, disk space used in the database, enterprises/workspaces using the asset, number of users using the asset, number of downloads, names of users who have downloaded the assets, dates of such downloads (including date ranges), and links to similar assets (i.e., metadata information may be similar such as keywords, collection, description, etc.).

The asset details screen 1000 may further comprise a notes section 1020 that allows any number of users to create and/or modify notes about the asset. Such notes may be stored by the system and associated with the asset. Accordingly, users may collaborate with one another by entering notes that are displayed to their colleagues.

Finally, the asset details screen 1000 may further comprise an associated files section 1026, allowing the user to upload, view and/or remove files associated with the asset. Exemplary associated files may include: license files, release files, brand compliance documents, model waiver documents, stock photo receipts, source design files and other files. At any time, the user may return to the digital asset list screen 900 by selecting the button 1032.

Figure 11:
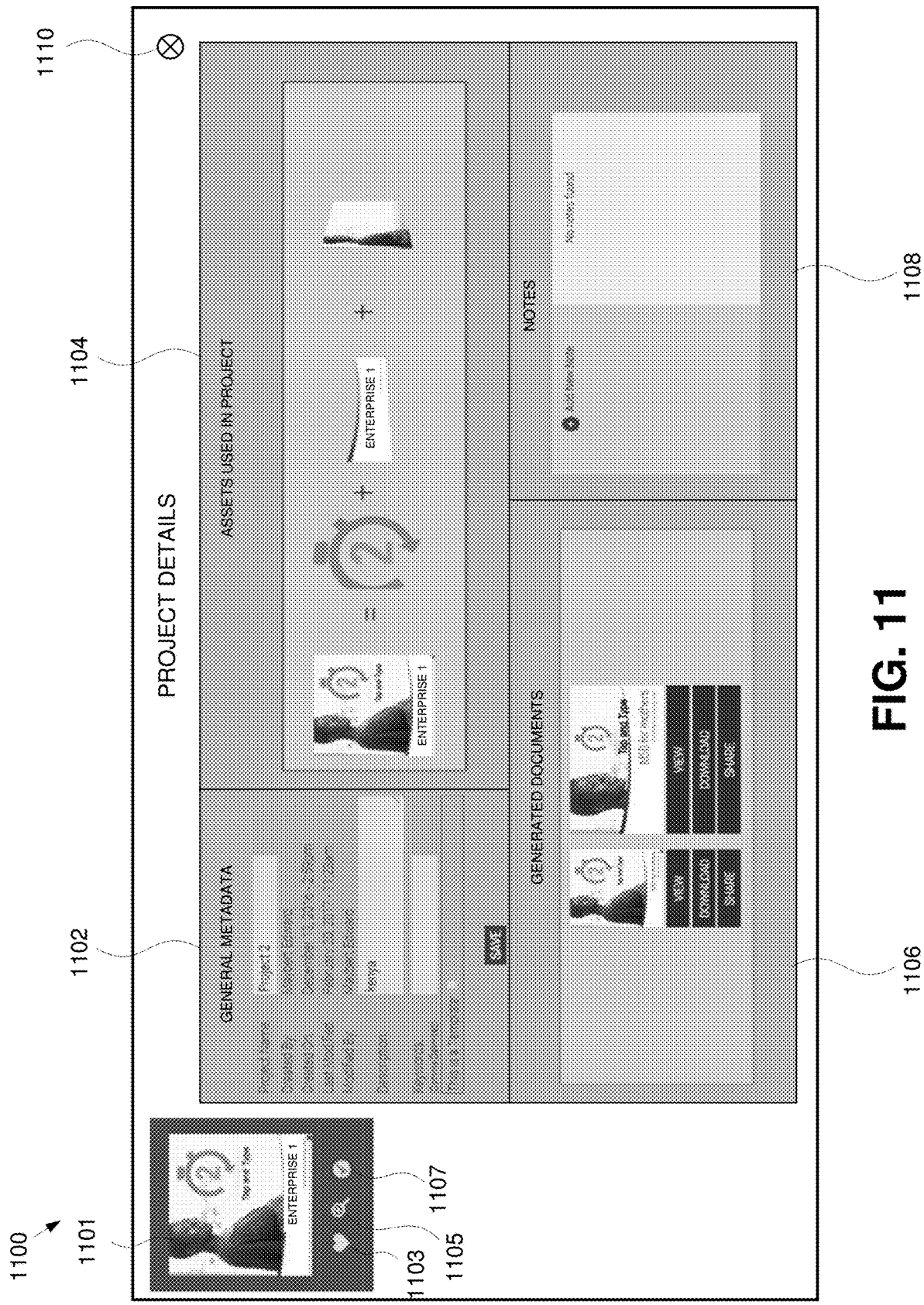
FIG. 11 is a project details screen showing an exemplary project stored in the digital asset management, creation, and sharing system.

Referring to FIG. 11, a project details screen 1100 is shown for an exemplary project/template stored in the system. This screen may be accessed by, for example, selecting a project asset and choosing the option to view and/or edit metadata associated with the project on the digital asset list screen (see FIG. 9). The project details screen 1100 shown in FIG. 11 is similar to that of FIG. 10 and only the differences are discussed below.

A thumbnail 1101 of the project may be provided in the left sidebar of the project details screen 1100. A set of additional options may be provided beneath the thumbnail allowing a user to favorite the project 1103, view a larger version 1105 of the thumbnail 1101, or view the publication status 1107 of the project.

The project details screen 1100 allows authorized users of the workspace to create and manage metadata associated with the project. As shown, the project details screen 1100 provides a general metadata section 1102 that displays project metadata that may be different from asset-level metadata, such as: project name, name of user who created the project, the date the project was created, and whether the project is a template.

Although not shown, the project details screen may display any custom enterprise-level and/or workspace-level metadata associated with the project. Moreover, an option may be provided to allow additional, project-level custom metadata to be set by a user (discussed above).

In certain embodiments, the project details screen 1100 may comprise an "assets used" section 1104 that displays the assets used in the project. This screen may also comprise a document preview section 1106 showing each document the project has been configured to generate. Any of such documents may be viewed, downloaded, and/or shared.

A notes section 1108 may provide the user the ability to add notes to the project. Such notes may be stored by the system and associated with the project. Accordingly, users may collaborate with one another by entering notes that are displayed to their colleagues. Such notes may further be displayed and/or updated in the document creation interface discussed below.

Finally, the user may return to the digital assets list screen 900 by selecting the close button 1110.

In one embodiment a project may be turned into a template by locking one or more elements of the projects 1102. Metadata will be uploaded accordingly. Such templates may incorporate any number of enterprise-level, workspace-level, and/or project-level rules.

Generally, templates comprise any number of locked elements, such as: assets (e.g. locked branding elements); dimensions and/or aspect ratios of outputted documents; file type of outputted documents; and/or sections (e.g. footer, header, body sections). Elements locked in this way may not be changed by a regular user who uses the template. For example, a template may include a locked footer, a locked logo in the upper-left corner, and/or a locked top margin having a specific size. In this way, compliance with visual identity guidelines may be ensured, while still allowing for users to create engaging communication materials.

In one embodiment, each of the documents outputted from a template may, themselves, comprise any number of additional locked assets. For example, a LinkedIn advertisement document of a template may require that an additional logo be added in a bottom right corner.

Document Creation and Sharing

Figure 13:
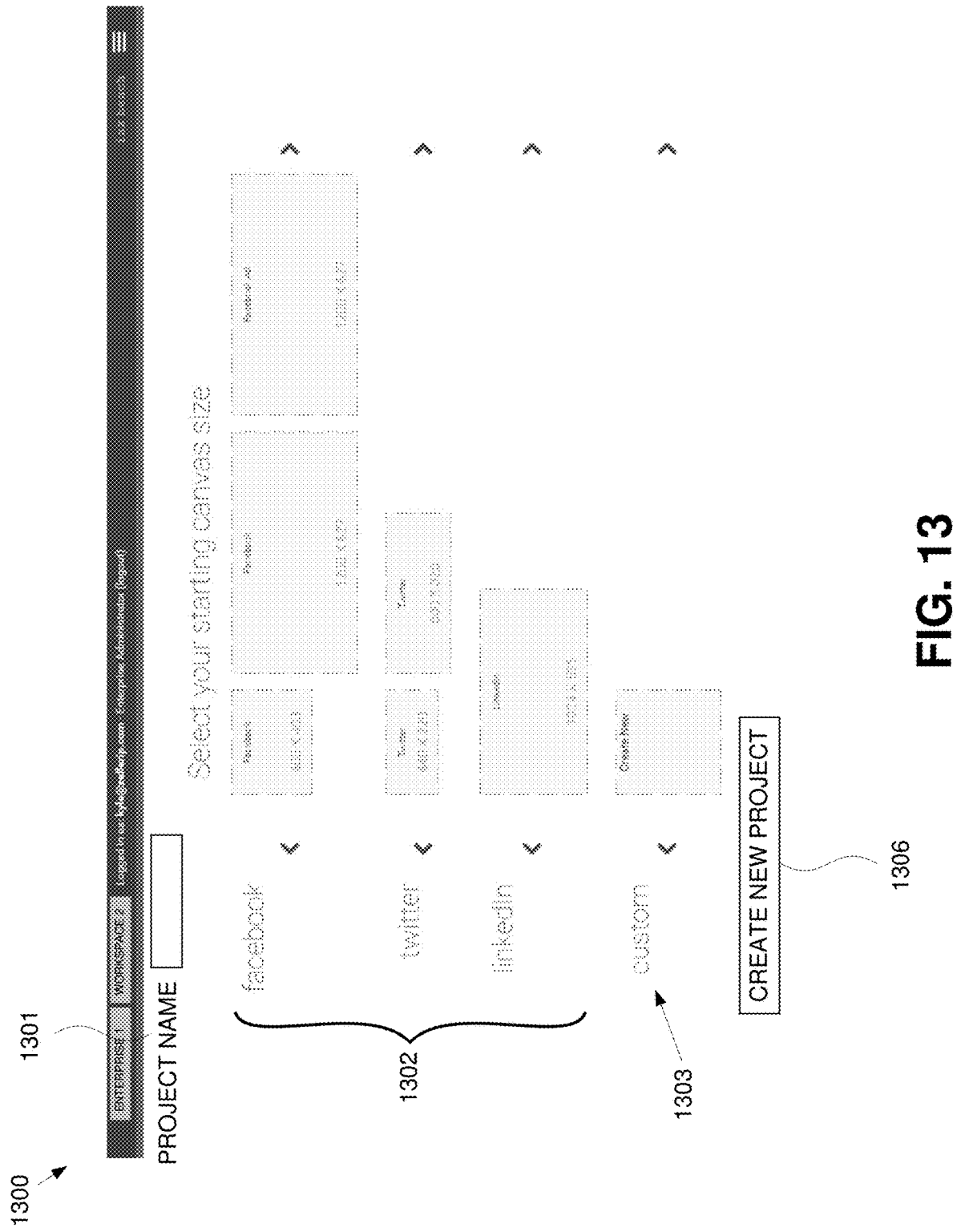
FIG. 13 is a project creation interface showing a number of canvas sizes.

Referring to FIG. 13, a project creation screen 1300 is illustrated. This screen may be accessed by, for example, selecting the "Start New Project" option at the navigation screen (see FIG. 6 at 606). As shown, the project creation screen 1300 allows a user to input a project name 1302 and specify the dimensions of an initial canvas to be used in the project. It should be noted that other canvas sizes associated with the project can be generated by the user subsequently, as discussed below.

In one embodiment, a number of predefined canvas sizes may be presented to the user. The predefined canvas sizes may conform with document publishing guidelines for a number of social media platforms (e.g., FACEBOOK, TWITTER, LINKEDIN, etc.). Accordingly, the canvas sizes (in pixels) may include Facebook-compatible sizes (1200× 627, 1200×627, and 403×403), Twitter-compatible sizes (440×220 and 800×320), and LinkedIn-compatible sizes (1024×535). In other embodiments predefined canvas sizes corresponding to other document-types may be available (e.g., posters, billboards, marketing flyers, websites, plasma screen graphics, emails and others). Additionally or alternatively, users may specify a custom-sized canvas 1303 having any dimensions. Once a canvas size is selected or entered, the user may create the project by selecting the "Create New Project" button 1306. User-defined canvas sizes can be designated by the user to be made available as an enterprise-, workspace- and/or user-specific option.

Figure 14A:
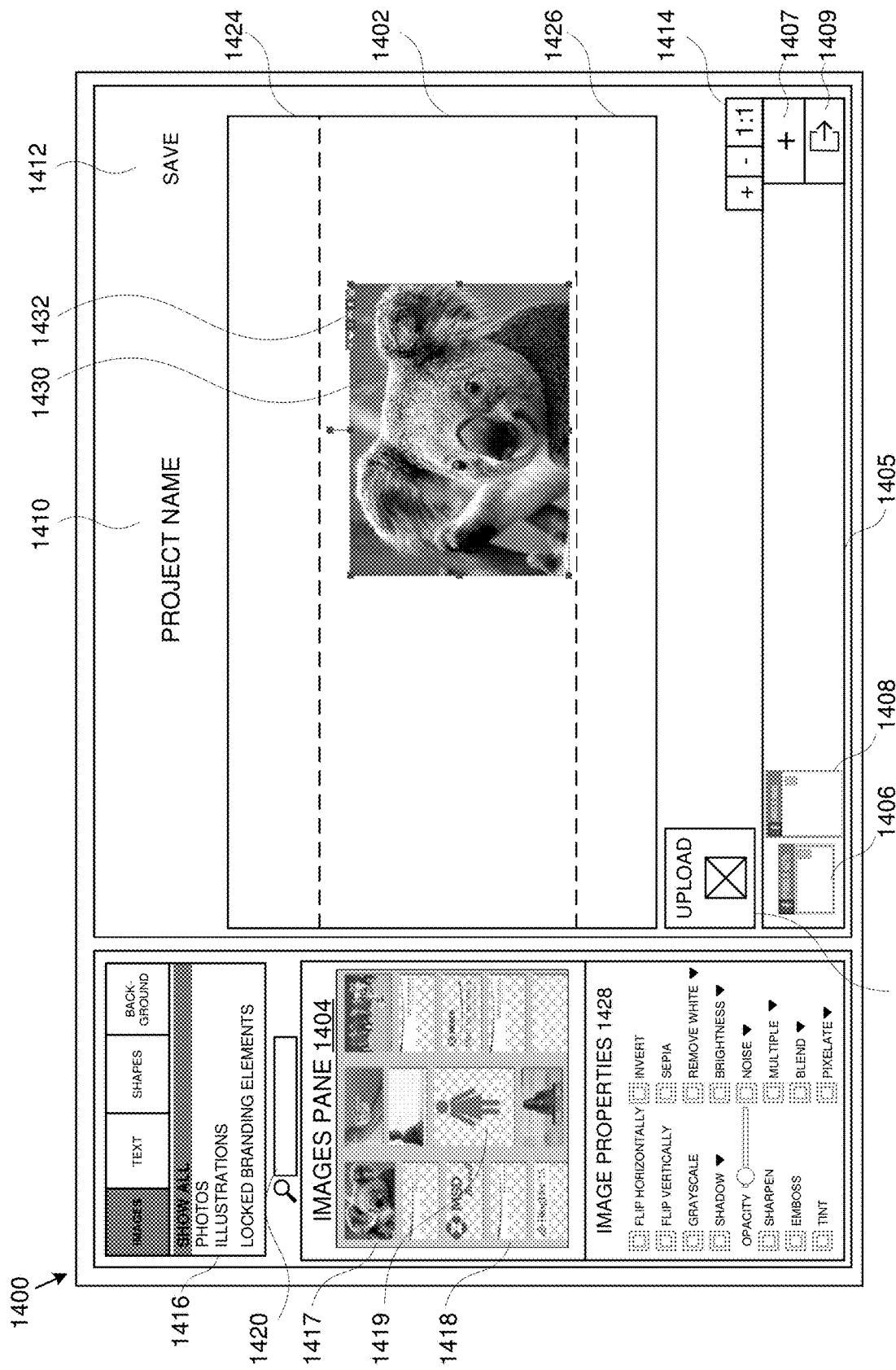
FIG. 14A is a project workspace screen showing options for adding an image to a project and applying filters to the same.

Referring to FIG. 14A, a project workspace screen 1400 of a document creation module is illustrated. This screen may comprise a canvas 1402; a sidebar adapted to display various panes (e.g., an images pane 1404, a text pane 1434, a shapes pane 1440, and/or a background pane 1446); and a documents list section. The screen may further comprise a project name section, a canvas zoom control 1414; and a save button 1412 that, when selected, saves all changes to the project in the system.

As shown, the project workspace comprises a canvas 1402. The canvas may comprise an editable area adapted to allow users to add digital assets, delete assets, and/or modify assets on the canvas. By default, each project comprises at least one canvas size with at least one asset.

In one embodiment, the canvas may comprise a plurality of sections, such as a header section 1424, a footer section 1426 and/or a body section (i.e., between the header section 1424 and the footer section 1426). Such sections may govern where certain assets may be placed on the canvas, how they are displayed, and/or the various image properties that may be modified.

In the illustrated embodiment, the workspace screen 1400 is being used to search for and add images to the canvas 1402. As shown, an images pane 1404 is displayed in the sidebar. The images pane 1404 may comprise an images list comprising images stored in the digital asset management system. Generally, a user may add one or more of the displayed images to the canvas 1402 by, for example, selecting the image and/or dragging the image from the list of images to the canvas 1402.

The images pane 1404 may comprise a search bar 1420 to allow users to search within the images pane 1404 (e.g., via keywords and/or title). The images pane 1404 may further comprise filtering functionality that allows the images results to be filtered according to any image metadata stored in the system. Such filters may be automatically populated based on the metadata stored in each of the images. In the illustrated embodiment, an image-type filter is displayed, allowing images to be filtered according to their type (e.g., photos, illustrations, and locked branding elements).

It will be appreciated that only assets associated with the current workspace, or which the user has uploaded for his or her own use, may be displayed in the images list. It will further be appreciated that, in some embodiments, the application may be integrated with third-party media hosting services, such as but not limited to image providers (e.g., BigStock), icon providers (e.g., Noun Project), and/or video providers (e.g., YouTube) for easy acquisition of media that may be imported directly into the application. Generally, only assets that can be incorporated into or modified by the canvas/tool will be made available in the canvas "view."

In certain embodiments, the images pane 1404 includes an image properties section 1428 comprising a number of tools that provide the ability to manipulate properties of a selected image, such as: horizontal flip, vertical flip, grayscale, shadow, opacity, sharpen, emboss, tiny, invert, sepia, remove white, modify brightness, modify noise, add transparency gradient, pixelate, multiply, and blend. A shadow filter may add a shadow effect to the image and provide the ability to modify certain properties of the shadow, such as the color, x-offset, y-offset, and blur amount. The color may be chosen from one of the colors set at the enterprise and/or workspace levels. Optionally, a custom color may be entered by the user (e.g., provided as a hex value).

The image 1430 may be resized using a number of anchor points provided on the perimeter of the image 1430. Additionally, a set of image tools 1432 may be provided to allow the asset to be duplicated, sent backwards (i.e., relative to other assets), assigned to a layer number, brought forwards (i.e. relative to other assets), deleted, and/or locked. When locked, the image may not be modified in any way until it is unlocked.

In one embodiment, the project workspace screen may comprise an asset upload option 1422. This option allows a user to upload an asset to the digital asset management system (see FIG. 12). After the asset is uploaded, it may be displayed in the images list and may be added to the canvas 1402.

Once the user is done modifying the elements of a canvas, documents of varying dimensions may be automatically or manually created (e.g., via a new document button 1407). Each newly created, resized document comprises all of the canvas elements in a substantially similar configuration, as controlled by a resizing algorithm.

In one embodiment, thumbnails of the created documents (1406, 1408) may be displayed to the user in a documents pane 1405. And any of the documents may be previewed by selecting a document preview option 1409.

Although not shown, a social media evaluator tool may be provided to automatically review created documents and determine whether they are in compliance with guidelines specific to a social media network. For example, a Facebook evaluator tool may allow the user to maintain compliance with Facebook guidelines prohibiting text from covering more than a specified proportion of an image posted to the site. If a created document does not comply with a certain guidelines, a notification may be presented to the user.

Figure 14B:
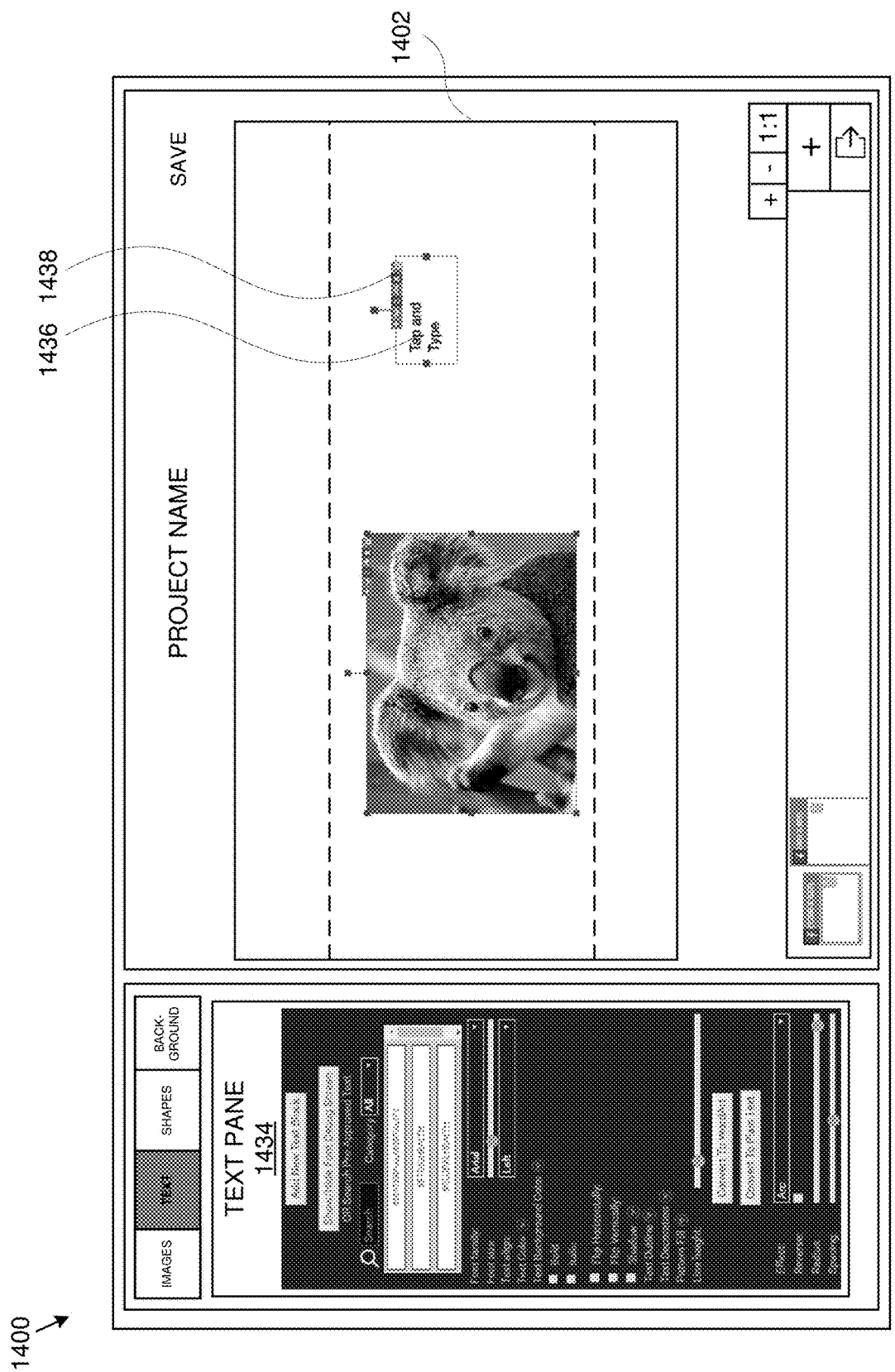
FIG. 14B is a project workspace screen showing options for adding text to the project and applying filters to the same.

Referring to FIG. 14B, the project workspace 1400 is shown, wherein an exemplary text pane 1434 is displayed within left sidebar. Generally, the text pane 1434 may be used to add text blocks to the canvas 1402 and/or to modify properties of text.

The text pane 1434 may comprise a list of approved text blocks (i.e., copy) that is stored in the digital asset management system. The text pane 1434 may comprise an option to add new text blocks to the system for use with the canvas 1402.

In one embodiment, the text pane 1434 may comprise a search bar to allow users to search within the text block list (e.g., via keywords and/or text block content). The text pane 1434 may further comprise filtering functionality that allows the text block list to be filtered according to any text block metadata stored in the system. Such filters may be automatically populated based on the metadata associated with each of the text blocks. In the illustrated embodiment, a text-block type filter is displayed, allowing text blocks to be filtered according to their type (e.g., "all," quotes, hashtags, slogans, etc.).

A user may add one or more of the displayed text blocks to the canvas 1402 by, for example, selecting the text block and/or dragging the text block from the list of approved text blocks to the canvas 1402. It will be appreciated that only text blocks to which the user has access may be displayed in the text block list.

In certain embodiments, the text pane 1434 comprises a text properties section. As shown, the text properties section may comprise a number of tools that provide the ability to manipulate properties of selected text, such as: font family, font size, text alignment, text color, text background color, bold, and italic. Additional tools may provide the ability to flip text horizontally, flip text vertically, add a shadow effect, add a text outline (and modify color/width thereof), add a text decoration (e.g. underline, strikethrough, overline), add a pattern fill, and/or change the line height of text in a text box 1436.

The text box 1436 may also be converted to word art through a button provided in the text pane 1434. Once the text is converted to word art, the text may be modified in the text pane 1434 through a number of effects (e.g. curved, arc, straight, small to large font, large to small font, alignment of text with any vector, bulged font). The text may also be reversed, the radius of any curves may be modified, and the spacing between characters may be modified. Additionally, any number of filters (e.g., the image filters provided in the image properties section 1428) may be applied to the text box 1436.

A set of text tools 1438 may be provided which may allow selected text boxes 1436 to be duplicated, sent backwards (i.e., relative to other assets), assigned to a layer number, brought forwards (i.e. relative to other assets), deleted, and/or locked. When locked, the text box 1436 may not be modified in any way until it is unlocked.

Figure 14C:
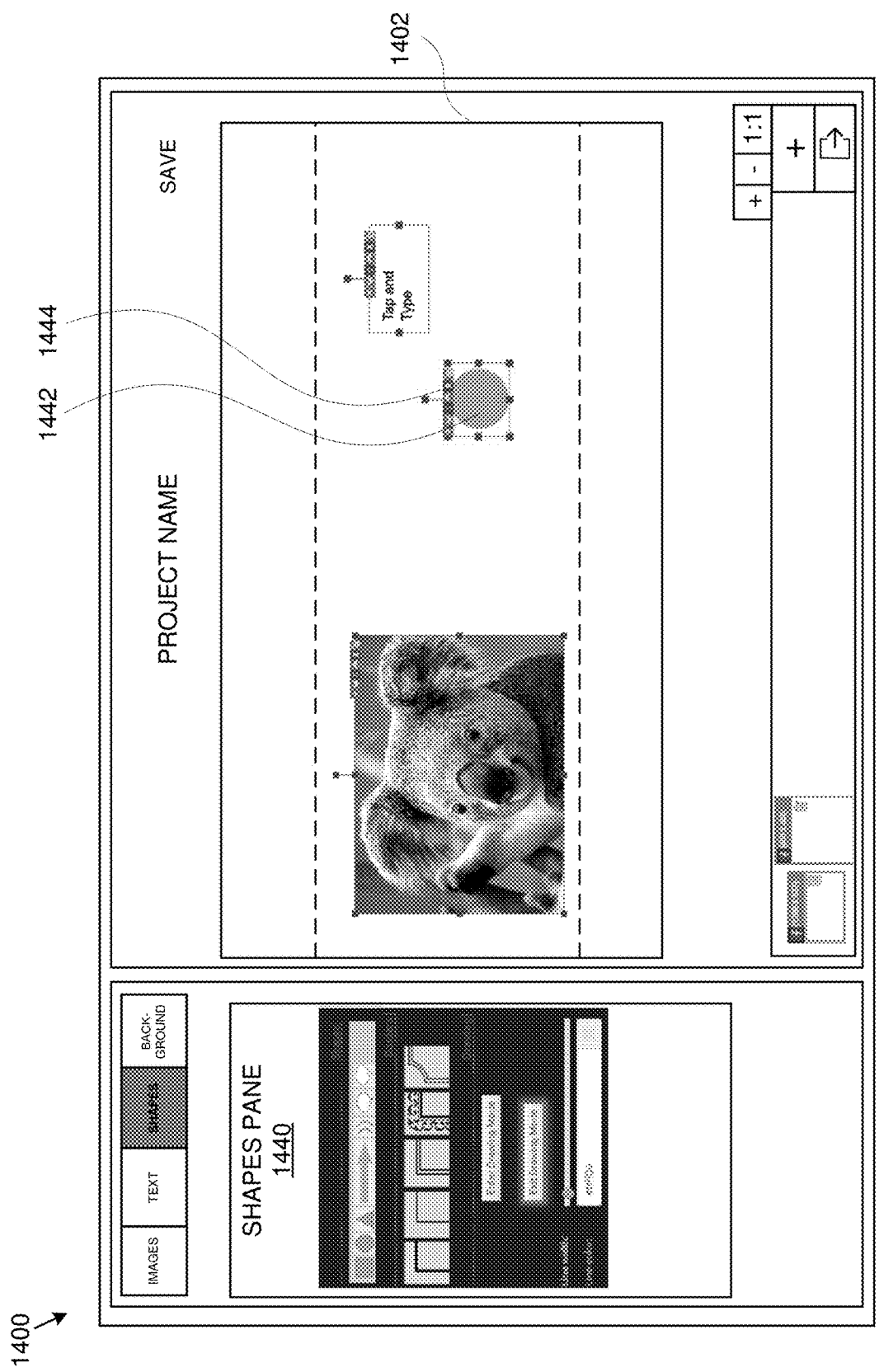
FIG. 14C is a project workspace screen showing options for adding shapes and borders to the project.

Referring to FIG. 14C, the project workspace 1400 is shown, wherein an exemplary shapes pane 1440 is displayed within left sidebar. Generally, the shapes pane 1440 may be used to add shapes, borders and/or drawings to the canvas 1402 and/or to modify properties of such objects.

The shapes pane 1440 may comprise lists of approved shapes and/or borders that are stored in the digital asset management system. It will be appreciated that only shapes and borders complete with visual identity/branding guidelines to which the user has access may be displayed in the respective lists.

A user may add one or more of the displayed shapes and/or borders to the canvas 1402 by, for example, selecting and/or dragging the asset from the list in the shapes pane 1440. Additionally, the shapes pane 1440 may allow a user to draw freely in the canvas 1402 by choosing a drawing option.

Once any of the shapes, borders, or free drawings is added to the canvas 1402, it is treated like any other asset and may be modified using filters similar to those presented in the image properties section 1428. Moreover, a set of image tools 1444 allows the shape to be duplicated, sent backwards (i.e., relative to other assets), assigned to a layer number, brought forwards (i.e., relative to other assets), deleted, and/or locked.

Figure 14D:
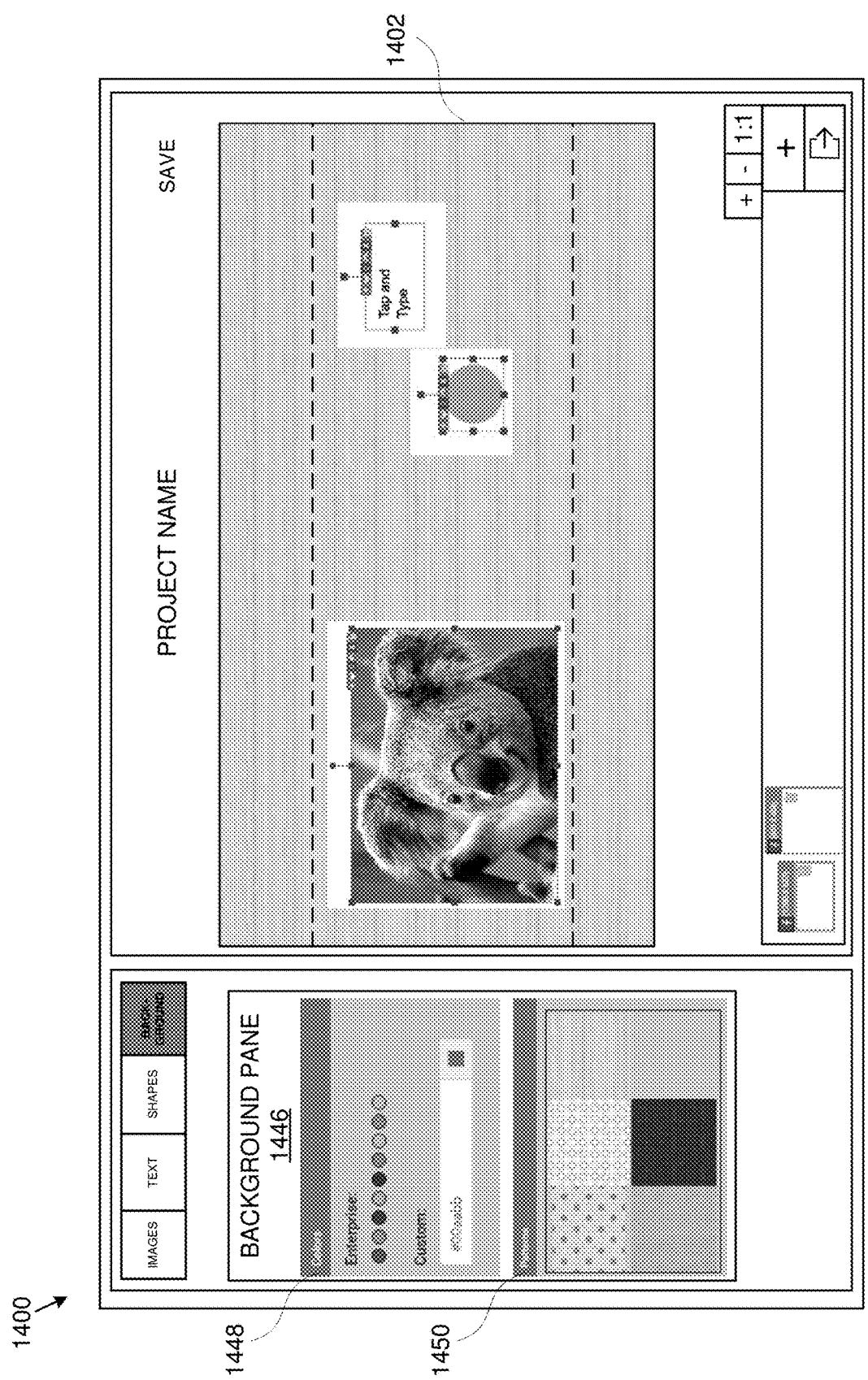
FIG. 14D is a project workspace screen showing options for adding a background to the project.

Referring to FIG. 14D, the project workspace 1400 is shown, wherein an exemplary background pane 1446 is displayed within the left sidebar. Generally, the background pane 1446 may be used to add a background color 1448 and/or a pattern fill 1450 to the canvas 1402 and/or to modify properties of such assets.

The background pane 1446 may comprise a background list comprising allowed, suggested and/or required background colors 1448 and/or patterns 1450 that are complete with the workspace branding/visual identity guidelines. It will be appreciated that the listed backgrounds may reflect rules created via the enterprise administration and/or workspace administration screens. Alternately, a custom color background may be selected by inputting a hex code. Depending on rules created via the enterprise administration and/or workspace administration screens, the custom color background may or may not be applied to the canvas 1402.

A user may add one or more of the displayed backgrounds to the canvas 1402 by, for example, selecting and/or dragging the background from the list of backgrounds. Once a background is added to the canvas 1402, it may be deleted and/or locked via background tools. When locked, the background may not be modified in any way until it is unlocked.

Figure 15:
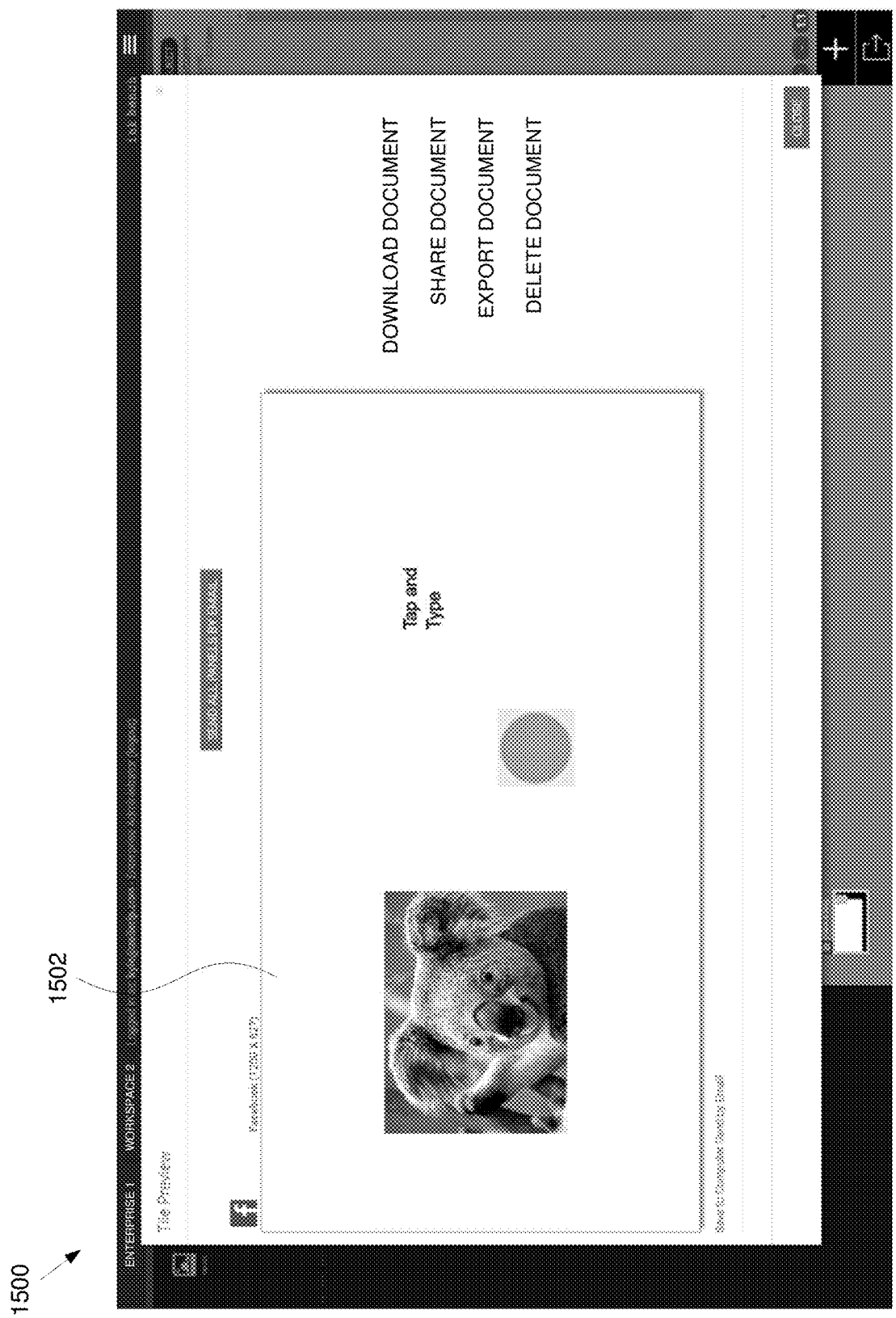
FIG. 15 is a document preview screen showing a document preview of the project.

Referring to FIG. 15, a document preview screen 1500 is illustrated. As shown, previews of one or more documents 1502 may be generated from the project canvas and may be displayed to a user. As shown the document may comprise each of the elements from the project canvas, arranged in a substantially similar configuration. The dimensions of any particular document may correspond to the canvas size selections made in the project creation screen 1300 shown in FIG. 13 or may be set separately.

In one embodiment, the document preview screen 1500 may present a number of options to the user, including but not limited to, an option to: download the document, share the document, export the document and/or delete the document.

Generally, the user may export the document as any number of file types (e.g., PDF, JPG, PNG, HTML, PSD, etc.). An exported document may be printed, saved to local or network memory, uploaded to the digital asset management system, shared via email, shared directly to one or more social media networks, and/or transmitted to any number of third-party applications (e.g., social media management applications, design applications, etc.).

Figure 17:
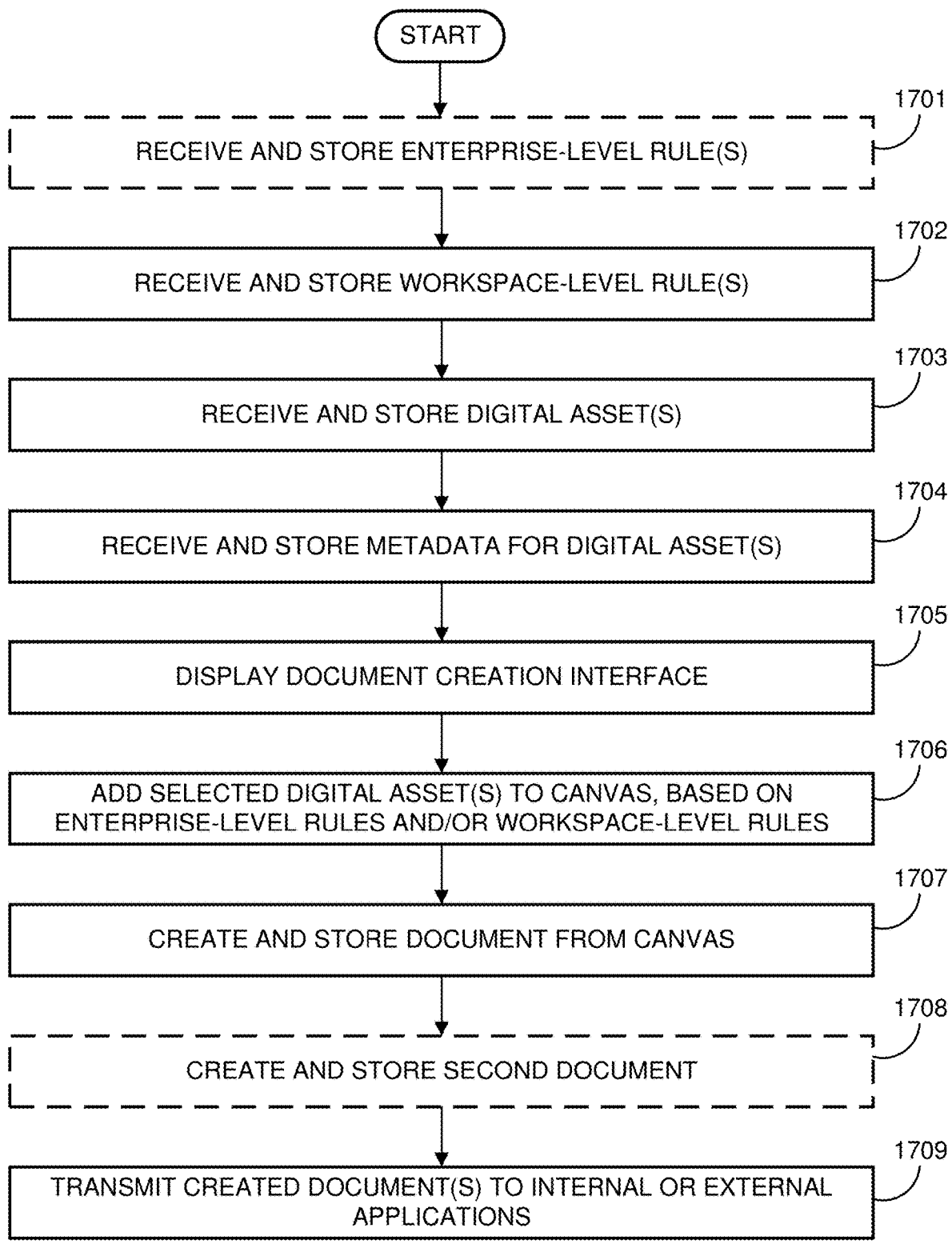
FIG. 17 is a method diagram illustrating an exemplary document creation process.

Referring to FIG. 17, an exemplary document creation method is illustrated. At a first optional step 1701, the system receives and stores an enterprise-level rule (e.g., via the enterprise administration screen). As discussed above, an admin user with appropriate privileges can create, update and/or delete rules governing various aspects of digital asset management and document creation for each of the workspaces associated with an enterprise.

At step 1702, the system receives and stores a workspace-level rule associated with a particular workspace (e.g., via the workspace administration screen). Generally, an admin user with appropriate privileges may create, update and/or delete rules governing various aspects of digital asset management and document creation for a workspace associated with an enterprise. Each of the workspaces within a given enterprise may be associated with any number of workspace-level rules, and such rules may be the same or different across workspaces.

At step 1703, the system receives and stores a digital asset from a user associated with the workspace. And at step 1704, the system receives and stores metadata associated with the digital asset. As discussed above, digital assets and associated metadata may be displayed to users of the digital asset management module and/or the document creation module. In certain embodiments, metadata may be employed to automatically generate and display search filters in one or both of these modules.

At step 1705, the system displays a document creation interface to the user. This interface comprises an editable canvas having dimensions that may be selected by a user. The document creation interface may also include a list of digital assets that are available for addition, by a user, to the canvas. It will be appreciated that the inclusion of digital assets within the list of digital assets may be based on any number of variables, including but not limited to, enterprise-level rules, workspace-level rules, asset-level rules, and user access privileges.

At step 1706, the system receives a selection of at least one of the listed digital assets from the user, and the selected asset is added to the canvas in accordance with any enterprise-level rules and/or the workspace-level rules. For example, such rules may govern any number of properties of the canvas and/or added assets (e.g., position, size, margins, padding, border, font, color, etc.).

At step 1707, a document is created from the canvas and stored. The document may have the same dimensions as the canvas and may comprise each of the digital assets added to the canvas in a substantially similar configuration. At optional step 1708, a second document may be created from the canvas and stored. The second document may have different dimensions than the first document. Moreover, the second document may comprise each of the digital assets added to the canvas and, in some instances, additional assets. It will be appreciated that, if the second document has different dimensions, any or all of the digital assets may be resized.

Finally, any of the created documents may be transmitted to internal or external applications at step 1709. In one embodiment, documents may be shared directly to one or more social media networks or via email. In another embodiment, documents may be transmitted to third-party social media management applications. In yet another embodiment, documents may be shared to various social media networks via an internal social media calendaring application.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a back-end component (e.g., a data server); a middleware component (e.g., an application server); a frontend component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A computer program product encoded on one or more non-transitory computer storage media, the computer program product comprising instructions that when executed by one or more computers cause the one or more computers to perform operations comprising:

receiving an enterprise rule relating to creating documents for a plurality of workspaces associated with an enterprise, the plurality of workspaces comprising a first workspace and a second workspace,
    wherein the enterprise rule specifies a plurality of allowable fonts selected from a plurality of available fonts;
receiving a first workspace rule relating to creating documents for the first workspace,
    wherein the first workspace rule specifies a first font selected from the plurality of allowable fonts;
receiving a second workspace rule relating to creating documents for the second workspace,
    wherein the second workspace rule specifies a second font selected from the plurality of allowable fonts, and
    wherein the second font is different than the first font;
storing the enterprise rule, the first workspace rule, and second workspace rule in a database;
storing a first digital asset associated with the enterprise and the first workspace in the database;
storing a second digital asset associated with the enterprise and the second workspace in the database;
displaying a first document creation interface to a first user associated with the enterprise and the first workspace, the interface comprising:
    a first canvas;
    a first list of digital assets comprising the first digital asset, but not the second digital asset; and
    a first text pane adapted to allow first text comprising the first font, but not the second font, to be added to the first canvas;
receiving an asset rule created by the first user specifying a behavior of the first digital asset upon being added to the first canvas of the first document creation interface;
adding the first digital asset to the first canvas in accordance with the enterprise rule, the first workspace rule, and the asset rule;
adding the first text to the first canvas in accordance with the enterprise rule and the first workspace rule;
creating from the first canvas, a project comprising the first digital asset and the first text;
receiving a project rule specifying that documents created from the project must include the first digital asset and the first text;
creating, from the project, a first document having first dimensions and comprising the first digital asset and the first text;
creating, from the project, a second document having second dimensions that are different than the first dimensions and comprising the first digital asset and the first text;
displaying a second document creation interface to a second user associated with the enterprise and the second workspace, the interface comprising:
    a second canvas;
    a second list of digital assets comprising the second digital asset, but not the first digital asset; and
    a second text pane adapted to allow second text comprising the second font, but not the first font, to be added to the second canvas;
adding the second digital asset and the second text to the second canvas in accordance with the enterprise rule and the second workspace rule;
creating, from the second canvas, a third document having third dimensions and comprising the second digital asset and the second text; and storing the project, the first document, the second document, and the third document in the database.

2. A computer program product according to claim 1, wherein the operations further comprise:
  storing first metadata associated with the first digital asset in the database; and
  storing second metadata associated with the second digital asset in the database.

3. A computer program product according to claim 2, wherein:
  the first document creation interface further comprises a list of digital asset search filters based on the stored first metadata; and
  the second document creation interface comprises a list of digital asset search filters based on the stored second metadata.

4. A computer program product according to claim 2, wherein the first metadata and the second metadata are selected from the group consisting of: asset usage rights, author, owner, upload date, download dates, asset type, collections, file type, geographic location, last-used date; license expiration date, license status, color, font, and transparency.

5. A computer program product according to claim 1, wherein the first digital asset and the second digital asset are selected from the group consisting of: images, photos, videos, animated GIFs, icons, logos, audio files, shapes, background colors/patterns, footers, and headers.

6. A computer program product according to claim 1, wherein the first document, the second document, and the third document are selected from the group consisting of: social media documents, cards, electronic cards, logos, flyers, banners, reports, presentations, brochures, calendars, infographics, publication covers, newsletters, collages, business cards, gift certificates, mockups, media kits, labels, posters, tickets, programs, resumes, proposals, letterheads, invitations, announcements, album covers, plasma screen backgrounds, and packaging.

7. A computer program product according to claim 6, wherein the first document is a social media document selected from the group consisting of: profile photos, cover photos, header photos, banner images, standard logos, square logos, hero photos, background images, thumbnail photos, timeline shared images, newsfeed shared images, highlighted images, and event images.

8. A computer program product according to claim 1, wherein the operations further comprise:
  associating the enterprise rule with the first digital asset and the second digital asset;
  associating the first workspace rule and the asset rule with the first digital asset; and
  associating the second workspace rule with the second digital asset.

9. A computer program product according to claim 1, wherein one or more of the enterprise rule, the first workspace rule and the second workspace rule further specifies the types of digital assets that may be added to documents or the types of digital assets that must be added to documents.

10. A computer program product according to claim 1, wherein one or more of the enterprise rule, the first workspace rule, the second workspace rule, and the project rule further specifies document properties selected from the group consisting of: sections, layers, margins, paddings, borders, dimensions, and colors.

11. A computer program product according to claim 1, wherein one or more of the enterprise rule, the first workspace rule, the second workspace rule, and the project rule further specifies properties of digital assets added to a document, such properties selected from the group consisting of: position, size, margins, padding, borders, and color.

12. A system comprising one or more computers and one or more storage devices storing instructions that when executed by the one or more computers cause the one or more computers to perform operations comprising:
  receiving an enterprise rule relating to creating documents for a plurality of workspaces associated with an enterprise, the plurality of workspaces comprising a first workspace and a second workspace,
    wherein the enterprise rule specifies a plurality of allowable fonts selected from a plurality of available fonts;
  receiving a first workspace rule relating to creating documents for the first workspace,
    wherein the first workspace rule specifies a first allowable font selected from the plurality of allowable fonts;
  receiving a second workspace rule relating to creating documents for the second workspace,
    wherein the second workspace rule specifies a second allowable font selected from the plurality of allowable fonts, and
    wherein the second allowable font is different than the first allowable font;
  storing the enterprise rule, the first workspace rule and the second workspace rule in a database;
  storing a first digital asset associated with the enterprise and the first workspace in the database;
  storing a second digital asset associated with the enterprise and the second workspace in the database;
  displaying a first document creation interface to a first user associated with the enterprise and the first workspace, the interface comprising:
    a first canvas;
    a first list of digital assets comprising the first digital asset, but not the second digital asset; and
    a first text pane adapted to allow first text comprising the first font, but not the second font, to be added to the first canvas;
  receiving an asset rule created by the first user specifying a behavior of the first digital asset upon being added to the first canvas of the first document creation interface;
  adding the first digital asset to the first canvas in accordance with the enterprise rule, the first workspace rule, and the asset rule;
  adding the first text to the first canvas in accordance with the enterprise rule and the first workspace rule;
  creating from the first canvas, a project comprising the first digital asset and the first text;
  receiving a project rule specifying that documents created from the project must include the first digital asset and the first text;
  creating from the project, a first document having first dimensions and comprising the first digital asset and the first text;
  creating from the project, a second document having second dimensions that are different than the first dimensions and comprising the first digital asset and the first text;
  displaying a second document creation interface to a second user associated with the enterprise and the second workspace, the interface comprising:

a second canvas;

a second list of digital assets comprising the second digital asset, but not the first digital asset; and a second text pane adapted to allow second text comprising the second font, but not the first font, to be added to the second canvas;

adding the second digital asset and the second text to the second canvas in accordance with the enterprise rule and the second workspace rule;

creating, from the second canvas, a third document having third dimensions and comprising the second digital asset and the second text; and storing the project, the first document, the second document, and the third document in the database.

13. A system according to claim 12, wherein the operations further comprise:

transmitting at least one of the first document, the second document, and the third document to a social media network or a social media management program.

14. A system according to claim 12, wherein the operations further comprise:

scheduling a first time to share the first document to a first social media network;

scheduling a second time to share the first document to a second social media network;

sharing the first document to the first social media network at the first time; and sharing the first document to the second social media network at the second time.

15. A system according to claim 12, wherein the operations further comprise:

storing first metadata associated with the first digital asset in the database; and storing second metadata associated with the second digital asset in the database.

16. A system according to claim 15, wherein:

the first document creation interface further comprises a list of digital asset search filters based on the stored first metadata; and the second document creation interface comprises a list of digital asset search filters based on the stored second metadata.

* * * * *